United States Patent
Irimie et al.

(10) Patent No.: US 11,936,688 B2
(45) Date of Patent: Mar. 19, 2024

(54) SYSTEMS AND METHODS FOR PERFORMING SIMULATED PHISHING ATTACKS USING SOCIAL ENGINEERING INDICATORS

(71) Applicant: KnowBe4, Inc., Clearwater, FL (US)

(72) Inventors: Alin Irimie, Clearwater, FL (US); Greg Kras, Dunedin, FL (US); David Austin, Dunedin, FL (US); Benjamin Dalton, St. Petersburg, FL (US)

(73) Assignee: KnowBe4, Inc., Clearwater, FL (US)

( * ) Notice: Subject to any disclaimer, the term of this patent is extended or adjusted under 35 U.S.C. 154(b) by 0 days.

(21) Appl. No.: 18/117,664

(22) Filed: Mar. 6, 2023

(65) Prior Publication Data
US 2023/0224328 A1    Jul. 13, 2023

Related U.S. Application Data

(63) Continuation of application No. 17/379,086, filed on Jul. 19, 2021, now Pat. No. 11,601,470, which is a continuation of application No. 16/750,640, filed on Jan. 23, 2020, now Pat. No. 11,070,587, which is a continuation of application No. 16/229,905, filed on Dec. 21, 2018, now Pat. No. 10,581,912, which is a
(Continued)

(51) Int. Cl.
| | | |
|---|---|---|
| *H04L 9/40* | (2022.01) | |
| *G06F 40/186* | (2020.01) | |
| *H04L 51/18* | (2022.01) | |
| *H04L 51/52* | (2022.01) | |

(52) U.S. Cl.
CPC ........ *H04L 63/1483* (2013.01); *G06F 40/186* (2020.01); *H04L 51/18* (2013.01); *H04L 51/52* (2022.05); *H04L 63/1433* (2013.01)

(58) Field of Classification Search
CPC ..... H04L 63/1483; H04L 51/18; H04L 51/52; H04L 63/1433; G06F 40/186
See application file for complete search history.

(56) References Cited

U.S. PATENT DOCUMENTS

| 7,599,992 B2 | 10/2009 | Nakajima |
| 8,041,769 B2 | 10/2011 | Shraim et al. |
(Continued)

FOREIGN PATENT DOCUMENTS

| EP | 3 582 468 A1 | 12/2019 |
| WO | WO-2016/164844 A1 | 10/2016 |

OTHER PUBLICATIONS

Foreign Search Report on EP dated Mar. 2, 2023.
(Continued)

*Primary Examiner* — Darren B Schwartz
(74) *Attorney, Agent, or Firm* — Foley & Lardner LLP

(57) ABSTRACT

Systems and methods are provided for performing simulated phishing attacks using social engineering indicators. One or more failure indicators can be configured in a phishing email template, and each failure indicator can be assigned a description about that failure indicator through use of a markup tag. The phishing email template containing the markup tags corresponding to the failure indicators can be stored and can be used to generate a simulated phishing email in which the one or more markup tags are removed.

20 Claims, 21 Drawing Sheets

Related U.S. Application Data continuation of application No. 15/662,083, filed on Jul. 27, 2017, now Pat. No. 10,165,006, which is a continuation of application No. 15/455,448, filed on Mar. 10, 2017, now Pat. No. 9,749,360.

(60) Provisional application No. 62/442,800, filed on Jan. 5, 2017.

(56) References Cited

U.S. PATENT DOCUMENTS

| | | | |
|---|---|---|---|
| 8,464,346 B2 | 6/2013 | Barai et al. | |
| 8,484,741 B1 | 7/2013 | Chapman | |
| 8,615,807 B1 | 12/2013 | Higbee et al. | |
| 8,635,703 B1* | 1/2014 | Belani | H04L 63/1483 726/25 |
| 8,719,940 B1 | 5/2014 | Higbee et al. | |
| 8,793,799 B2 | 7/2014 | Fritzson et al. | |
| 8,910,281 B1 | 12/2014 | Aharoni et al. | |
| 8,910,287 B1 | 12/2014 | Belani et al. | |
| 8,966,637 B2 | 2/2015 | Belani et al. | |
| 9,053,326 B2 | 6/2015 | Higbee et al. | |
| 9,246,936 B1 | 1/2016 | Belani et al. | |
| 9,253,207 B2 | 2/2016 | Higbee et al. | |
| 9,262,629 B2 | 2/2016 | Belani et al. | |
| 9,325,730 B2 | 4/2016 | Higbee et al. | |
| 9,356,948 B2 | 5/2016 | Higbee et al. | |
| 9,373,267 B2 | 6/2016 | Sadeh-Koniecpol et al. | |
| 9,398,029 B2 | 7/2016 | Sadeh-Koniecpol et al. | |
| 9,398,038 B2* | 7/2016 | Higbee | H04L 63/1483 |
| 9,547,998 B2 | 1/2017 | Sadeh-Koniecpol et al. | |
| 9,548,988 B1 | 1/2017 | Roundy et al. | |
| 9,591,017 B1 | 3/2017 | Higbee et al. | |
| 9,635,052 B2 | 4/2017 | Hadnagy | |
| 9,667,645 B1 | 5/2017 | Belani et al. | |
| 9,674,221 B1 | 6/2017 | Higbee et al. | |
| 9,729,573 B2 | 8/2017 | Gatti | |
| 9,813,454 B2 | 11/2017 | Sadeh-Koniecpol et al. | |
| 9,870,715 B2 | 1/2018 | Sadeh-Koniecpol et al. | |
| 9,876,753 B1 | 1/2018 | Hawthorn | |
| 9,894,092 B2 | 2/2018 | Irimie et al. | |
| 9,906,554 B2 | 2/2018 | Higbee et al. | |
| 9,912,687 B1 | 3/2018 | Wescoe et al. | |
| 9,942,249 B2 | 4/2018 | Gatti | |
| 9,998,480 B1 | 6/2018 | Gates et al. | |
| 10,026,110 B2 | 7/2018 | Barday | |
| 10,129,195 B1 | 11/2018 | Jakobsson | |
| 10,176,153 B1 | 1/2019 | Sack | |
| 10,243,904 B1 | 3/2019 | Wescoe et al. | |
| 10,277,628 B1 | 4/2019 | Jakobsson | |
| 10,904,186 B1 | 1/2021 | Everton et al. | |
| 10,986,122 B2 | 4/2021 | Bloxham et al. | |
| 11,044,267 B2 | 6/2021 | Jakobsson et al. | |
| 11,184,393 B1 | 11/2021 | Gendre et al. | |
| 11,297,094 B2 | 4/2022 | Huda | |
| 2004/0177110 A1* | 9/2004 | Rounthwaite | H04L 51/212 709/202 |
| 2007/0061734 A1 | 3/2007 | Abdulhayoglu | |
| 2007/0142030 A1 | 6/2007 | Sinha et al. | |
| 2009/0144308 A1* | 6/2009 | Huie | H04L 63/1483 707/999.102 |
| 2010/0211641 A1 | 8/2010 | Yih et al. | |
| 2010/0269175 A1 | 10/2010 | Stolfo et al. | |
| 2010/0313253 A1 | 12/2010 | Reiss | |
| 2012/0054858 A1* | 3/2012 | Andersen | H04L 51/212 709/206 |
| 2012/0124671 A1 | 5/2012 | Fritzson et al. | |
| 2012/0215853 A1 | 8/2012 | Sundaram et al. | |
| 2012/0258437 A1* | 10/2012 | Sadeh-Koniecpol | G06F 21/56 434/362 |
| 2013/0198846 A1 | 8/2013 | Chapman | |
| 2013/0203023 A1 | 8/2013 | Sadeh-Koniecpol et al. | |
| 2013/0219495 A1 | 8/2013 | Kulaga et al. | |
| 2013/0297375 A1 | 11/2013 | Chapman | |
| 2014/0173726 A1 | 6/2014 | Varenhorst | |
| 2014/0199663 A1* | 7/2014 | Sadeh-Koniecpol | H04L 63/1408 434/118 |
| 2014/0199664 A1 | 7/2014 | Sadeh-Koniecpol et al. | |
| 2014/0201835 A1 | 7/2014 | Emigh et al. | |
| 2014/0230060 A1 | 8/2014 | Higbee et al. | |
| 2014/0230061 A1 | 8/2014 | Higbee et al. | |
| 2014/0230065 A1 | 8/2014 | Belani et al. | |
| 2015/0163242 A1 | 6/2015 | Laidlaw et al. | |
| 2015/0180896 A1 | 6/2015 | Higbee et al. | |
| 2015/0229664 A1* | 8/2015 | Hawthorn | H04L 63/1433 726/25 |
| 2015/0287336 A1* | 10/2015 | Scheeres | G09B 5/02 434/156 |
| 2016/0036829 A1 | 2/2016 | Sadeh-Koniecpol et al. | |
| 2016/0057167 A1 | 2/2016 | Bach | |
| 2016/0142439 A1 | 5/2016 | Goutal | |
| 2016/0164898 A1 | 6/2016 | Belani et al. | |
| 2016/0173510 A1 | 6/2016 | Harris et al. | |
| 2016/0234245 A1 | 8/2016 | Chapman | |
| 2016/0261618 A1 | 9/2016 | Koshelev | |
| 2016/0301705 A1 | 10/2016 | Higbee et al. | |
| 2016/0301716 A1 | 10/2016 | Sadeh-Koniecpol et al. | |
| 2016/0308897 A1* | 10/2016 | Chapman | G06F 40/186 |
| 2016/0330238 A1 | 11/2016 | Hadnagy | |
| 2016/0337401 A1 | 11/2016 | Bendersky et al. | |
| 2017/0026388 A1* | 1/2017 | Gatti | H04L 51/212 |
| 2017/0026409 A1* | 1/2017 | Gatti | H04L 63/1483 |
| 2017/0026410 A1* | 1/2017 | Gatti | H04L 63/1483 |
| 2017/0034211 A1 | 2/2017 | Buergi et al. | |
| 2017/0078321 A1 | 3/2017 | Maylor et al. | |
| 2017/0078322 A1 | 3/2017 | Seiver et al. | |
| 2017/0104778 A1 | 4/2017 | Shabtai et al. | |
| 2017/0126730 A1* | 5/2017 | Oberheide | H04L 63/1483 |
| 2017/0140663 A1 | 5/2017 | Sadeh-Koniecpol et al. | |
| 2017/0237776 A1 | 8/2017 | Higbee et al. | |
| 2017/0244746 A1 | 8/2017 | Hawthorn et al. | |
| 2017/0251009 A1 | 8/2017 | Irimie et al. | |
| 2017/0251010 A1 | 8/2017 | Irimie et al. | |
| 2017/0318046 A1 | 11/2017 | Weidman | |
| 2017/0331848 A1* | 11/2017 | Alsaleh | H04L 63/1483 |
| 2018/0041537 A1 | 2/2018 | Bloxham et al. | |
| 2018/0103052 A1 | 4/2018 | Choudhury et al. | |
| 2019/0173819 A1 | 6/2019 | Wescoe et al. | |
| 2019/0215335 A1 | 7/2019 | Benishti | |
| 2019/0245885 A1 | 8/2019 | Starink et al. | |
| 2019/0245894 A1 | 8/2019 | Epple et al. | |
| 2020/0311260 A1 | 10/2020 | Klonowski et al. | |
| 2021/0185075 A1 | 6/2021 | Adams | |
| 2021/0194924 A1 | 6/2021 | Heinemeyer et al. | |
| 2022/0078207 A1 | 3/2022 | Chang et al. | |
| 2022/0094702 A1 | 3/2022 | Saad Ahmed et al. | |
| 2022/0100332 A1 | 3/2022 | Haworth et al. | |
| 2022/0116419 A1 | 4/2022 | Kelm et al. | |
| 2022/0130274 A1 | 4/2022 | Krishna Raju et al. | |
| 2022/0286419 A1 | 9/2022 | Stetzer et al. | |

OTHER PUBLICATIONS

"Admin.phishproof.com Campaign Org1580:2560". Inspired elearning. https://admin.phishproof.com/campaigns/Org1580/2560. Dec. 2015.

"Admin.phishproof.com Campaign Org2005:5153". Inspired elearning. https://admin.phishproof.com/campaigns/Org2005/5153. Jul. 2016.

"Admin.phishproof.com Campaign Org2526:933". Inspired elearning. https://admin.phishproof.com/campaigns/Org2526/933. Jul. 2015.

"Admin.phishproof.com Campaign Org3838:4730". Inspired elearning. https://admin.phishproof.com/campaigns/Org3838/4730. Jun. 2016.

"Admin.phishproof.com Campaign Org3838:4892". Inspired elearning. https://admin.phishproof.com/campaigns/Org3838/4892. Jun. 2016.

"Admin.phishproof.com Campaign Org408:2728". Inspired elearning. https://admin.phishproof.com/campaigns/Org408/2728. Jan. 2016.

"Admin.phishproof.com Campaign Org408:3013". Inspired elearning. https://admin.phishproof.com/campaigns/Org408/3013. Jan. 2016.

(56) References Cited

OTHER PUBLICATIONS

"Lucy". gtta. net. Published: Sep. 2015, Jun. 2016, Jul. 2016, Sep. 2016, Dec. 2016.
"SecurityIQ, AwareEd, and PhishSim User's Manual". Infosec Resources, Oct. 2016.
"The PhishProof Editor Guide 3.3". Inspired elearning LLC, 2016.
"Threatsim". threatsim.com as archived by web-beta.archive.org, Jun. 30, 2015.
"Wombat Security Technologies: Threatsim". www.wombatsecurity.com as archived by web-beta.archive.org, Mar. 15, 2016.
Corrected Notice of Allowability for U.S. Appl. No. 16/229,905, dated Feb. 27, 2019 (6 pages).
European Examination Report on EP Apln. 17830085.1 dated Apr. 29, 2021 (6 Pages).
International Preliminary Report on Patentability for PCT/US2017/068291, dated Jul. 18, 2019 (8 Pages).
International Search Report and Written Opinion for PCT/US2017/068291, dated Mar. 23, 2018 (13 Pages).
Jakobbson et al. "Designing Ethical Phishing Experiments: A study of (ROT13) rOnl query features," WWW 2006, May 23-26, 2006, ACM.
Non-Final Office Action on U.S. Appl. No. 16/750,640 dated Dec. 3, 2020 (14 Pages).
Notice of Allowance for U.S. Appl. No. 15/662,083, dated Aug. 23, 2018.
Notice of Allowance for U.S. Appl. No. 16/229,905, dated Nov. 14, 2019 (5 Pages).
Notice of Allowance for U.S. Appl. No. 16/229,905, dated Sep. 5, 2019 (10 Pages).
Notice of Allowance on U.S. Appl. No. 16/750,640 dated Mar. 31, 2021 (10 Pages).
Notice of Allowance on U.S. Appl. No. 17/379,086 dated Dec. 22, 2022 (11 Pages).
Olzak, "Phishme: The Easy Way to Enhance Employee Phishing Awareness", Bright Hub, Inc., Jul. 4, 2011, http://web .archive .org/web/20081204144816/http ://www.brighthub.com/computing/enterprisesecurity/reviews/5298 .aspx (last visited Aug. 9, 2016). (Year: 2016).
U.S. Notice of Allowance on U.S. Appl. No. 15/455,448 dated Jun. 7, 2017 (17 Pages).

* cited by examiner

SYSTEMS AND METHODS FOR PERFORMING SIMULATED PHISHING ATTACKS USING SOCIAL ENGINEERING INDICATORS

CROSS-REFERENCE TO RELATED APPLICATIONS

This application is a continuation of and claims priority to and the benefit of U.S. Non-Provisional application Ser. No. 17/379,086, filed Jul. 19, 2021, titled "SYSTEMS AND METHODS FOR PERFORMING SIMULATED PHISHING ATTACKS USING SOCIAL ENGINEERING INDICATORS," which is a continuation of and claims priority to and the benefit of U.S. Non-Provisional application Ser. No. 16/750,640, filed Jan. 23, 2020, titled "SYSTEMS AND METHODS FOR PERFORMING SIMULATED PHISHING ATTACKS USING SOCIAL ENGINEERING INDICATORS," which is a continuation of and claims priority to and the benefit of U.S. Non-Provisional application Ser. No. 16/229,905, filed Dec. 21, 2018, titled "SYSTEMS AND METHODS FOR PERFORMING SIMULATED PHISHING ATTACKS USING SOCIAL ENGINEERING INDICATORS," which claims priority to and the benefit of U.S. Non-Provisional application Ser. No. 15/662,083, filed Jul. 27, 2017, titled "SYSTEMS AND METHODS FOR PERFORMING SIMULATED PHISHING ATTACKS USING SOCIAL ENGINEERING INDICATORS," which claims priority to and the benefit of U.S. Non-Provisional application Ser. No. 15/455,448, filed Mar. 10, 2017, and titled "SYSTEMS AND METHODS FOR PERFORMING SIMULATED PHISHING ATTACKS USING SOCIAL ENGINEERING INDICATORS," which claims priority to and the benefit of U.S. Provisional Patent Application No. 62/442,800, filed on Jan. 5, 2017, and titled "SYSTEMS AND METHODS FOR PERFORMING SIMULATED PHISHING ATTACKS USING SOCIAL ENGINEERING INDICATORS," all of which are hereby incorporated by reference in their entirety for all purposes.

FIELD OF THE DISCLOSURE

This disclosure generally relates to systems and methods for configuring email phishing templates to store failure indicators and their descriptions in the email phishing template in a way that is visible to the system administrator but invisible to a user or set of users; delivering the email based on the email template containing the stored failure indicators which are invisible to the user or set of users; revealing the stored but invisible failure indicators to a user only when the user fails the simulated phishing attack; and providing attack results to the system administrator based on the outcomes of the simulated phishing attacks

BACKGROUND OF THE DISCLOSURE

It can be useful to perform simulated phishing attacks on a user or a set of users. A phishing attack involves an attempt to acquire sensitive information such as usernames, passwords, credit card details, etc., often for malicious reasons, possibly by masquerading as a trustworthy entity. For example, an email may be sent to a target, the email having an attachment that performs malicious actions when executed or a link to a webpage that either performs malicious actions when accessed or prompts the user to execute a malicious program. Malicious actions may be malicious data collection or actions harmful to the normal functioning of a device on which the email was activated, or any other malicious actions capable of being performed by a program or a set of programs. Simulated phishing attacks allow an organization to determine the level of vulnerability to phishing attacks of a user or set of users. This knowledge can be used by internet technology organizations to reduce this level of vulnerability through tools or training.

BRIEF SUMMARY OF THE DISCLOSURE

Methods, systems and apparatus are provided which allow one or more hidden social engineering based failure indicators to be embedded in an email template which can be used for simulated phishing attacks. Each of the social engineering based failure indicators are marked with a flag in the creation of the email template, and with each failure indicator a text field to provide a description can be provided. The description which can be used to provide detail about the given failure indicator, such as why that failure indicator is recognizable. When a simulated phishing campaign is created, the phishing email template with the failure indicators can be selected and can be sent to one or more users.

If the user that receives the email based upon the phishing email template containing the social engineering based failure indicators interacts with the email in some way, such as by clicking a link, or by replying to or forwarding the email, then the user will automatically be shown which of the failure indicators were in the email that they responded to, along with an explanation of why these failure indicators should have been recognizable. The failure indicators may be shown to the user by presenting the user with a copy of the email that they interacted with, with the failure indicators highlighted with flags. When the user interacts with the failure indicators, such as by clicking on the flags or by hovering over the flags with their mouse, the user is shown a text field which explains why the failure indicator should have been recognizable. In addition to the specific failure indicators highlighted by the flags, there may be a generic failure indicator about the entire email that is shown to the user along with the copy of the email. Instead of seeing a copy of the email, the user may be shown a list of the failure indicators that were included in the email.

A specific landing page may also be created for users of the social engineering based failure indicator simulated phishing campaign. In this case, if the user interacts with the simulated phishing email in any way, they will be redirected to a landing page, which can be the specific landing page created for this campaign. The landing page can alert the user that they have failed the simulated phishing attack, and can provide real time general or specific learning materials to the user that failed the test.

The methods, systems and apparatus further provide indicators to the organization about the results of the simulated phishing attack. In particular, the system may provide information about which failure indicator or group of failure indicators were most likely to induce a failure by a user.

In one embodiment, a method is provided for configuring one or more failure indicators in a phishing email template, and assigning each of the failure indicators a description about that failure indicator through use of a markup tag. The phishing email template containing the markup tags corresponding to the failure indicators is stored and can be used to generate a simulated phishing email in which the one or more markup tags are removed.

In some implementations, the method further includes selecting, via the editing tool, to create a custom phishing email template. In some implementations, the one or more failure indicators is selected from a category of the following categories: sender, subject, content, attachment, link and overall.

In some implementations, the method further includes generating the markup tag to be included in one of a field of the phishing email template or a body of the phishing email template. In some implementations, the method further includes generating the markup tag to be one of self-terminating or to encapsulate one of text or an image. In some implementations, the method further includes generating the markup tag to be a hypertext markup language tag including a predetermined name and one or more attributes to specify how the flag is to be displayed.

In some implementations, the method further includes associating the simulated phishing email with the stored phishing email template. In some implementations, the method further includes generating the simulated phishing email to include a link to a display of a copy of the simulated phishing email with the one or more flags of the markup tags shown.

In another embodiment, a system is provided for configuring a simulated phishing email with failure indicators, the system including an editing tool able to modify a phishing email template to include one or more failure indicators in the form of markup tags which comprise an attribute that describes the failure indicator, and further enabled to store the source code of the phishing email template and to generate a simulated phishing email based on the modified and stored phishing email template with the markup tags removed.

In some implementations, the editing tool is configured to create a custom phishing email template. In some implementations, the flag for the one or more failure indicators is selected from a category of the following categories: sender, subject, content, attachment, link and overall.

In some implementations, the markup tag is generated to be included in one of a field of the phishing email template or a body of the phishing email template. In some implementations, the markup tag is configured to be one of self-terminating or to encapsulate one of text or an image. In some implementations, the markup tag includes a hypertext markup language tag with a predetermined name and one or more attributes to specify how the flag is to be displayed.

In some implementations, the simulated phishing email is associated with the stored phishing email template. In some implementations, the simulated phishing email includes a link to a uniform resource locator including a display of a copy of the simulated phishing email with the one or more flags of the markup tags shown.

In another embodiment, a method is provided for running a simulated phishing email attack using a phishing email template that comprises one or more failure indicators and their descriptions, the method including transmitting the simulated phishing email with the markup tags removed to one or more user's email accounts; traversing, based on the user interacting with the simulated phishing attack to a display of a copy of the simulated phishing email in which the failure indicators in the email template are displayed, and further displaying the descriptions of these failure indicators to the user in response to the user interacting with the flags in the copy of the simulated phishing email.

In some implementations, the method further includes receiving a click on a portion of the simulated phishing email corresponding to a failure indicator. In some implementations, the method further includes receiving a click on a uniform resource locator within the simulated phishing email corresponding to a failure indicator. In some implementations, the method further includes traversing via the link to a landing page that embeds the copy of the simulated phishing with one or more flags highlighted.

In some implementations, the method further includes highlighting the flag of the failure indicator that was clicked on in the simulated phishing email. In some implementations, the method further includes displaying the description in one of a pop up box or overlay responsive to a pointer hovering over the flag. In some implementations, the method further includes tracking which users of email accounts clicked on the simulated phishing email. In some implementations, the method further includes tracking the one or more failure indicators associated with the users clicking on the simulated phishing email.

In another embodiment, a system is provided for running a simulated phishing email attack based on failure indicators, the system comprising a simulated attack manager which is configured to transmit a simulated phishing email which is based on a phishing email template which contains failure indicators to one or more user email accounts, the simulated phishing email comprising a link to a copy of the simulated phishing email where the failure indicators are visible, and responsive to a user interaction on a flag in the copy of the simulated phishing email, the system displays the description about the failure indicator corresponding to the flag.

In some implementations, the simulated phishing email is further configured to traverse via the link responsive to a click on a portion of the simulated phishing email corresponding to a failure indicator. In some implementations, the simulated phishing emails is further configured to traverse via the link responsive to a click on a uniform resource locator within the simulated phishing email corresponding to a failure indicator. In some implementations, the link includes a landing page that embeds the copy of the simulated phishing with one or more flags highlighted.

In some implementations, the copy of the simulated phishing email is further configured to highlight the flag of the failure indicator that was clicked on in the simulated phishing email. In some implementations, the copy of the simulated phishing email is further configured to display the description in one of a pop up box or overlay responsive to a pointer hovering over the flag. In some implementations, the simulated phishing attack manager is further configured to track which users of email accounts clicked on the simulated phishing email. In some implementations, the simulated phishing attack manager is further configured to track the one or more failure indicators associated with the users clicking on the simulated phishing email.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 16 depicts a second example of creating a new phishing campaign, according to an illustrative example.

FIG. 17 depicts an example of editing a phishing campaign, comprising selecting a customized landing page for simulated phishing email that contains social engineering indicators.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for simulated phishing attacks using social engineering indicators.

A. Computing and Network Environment

Figure 1A:
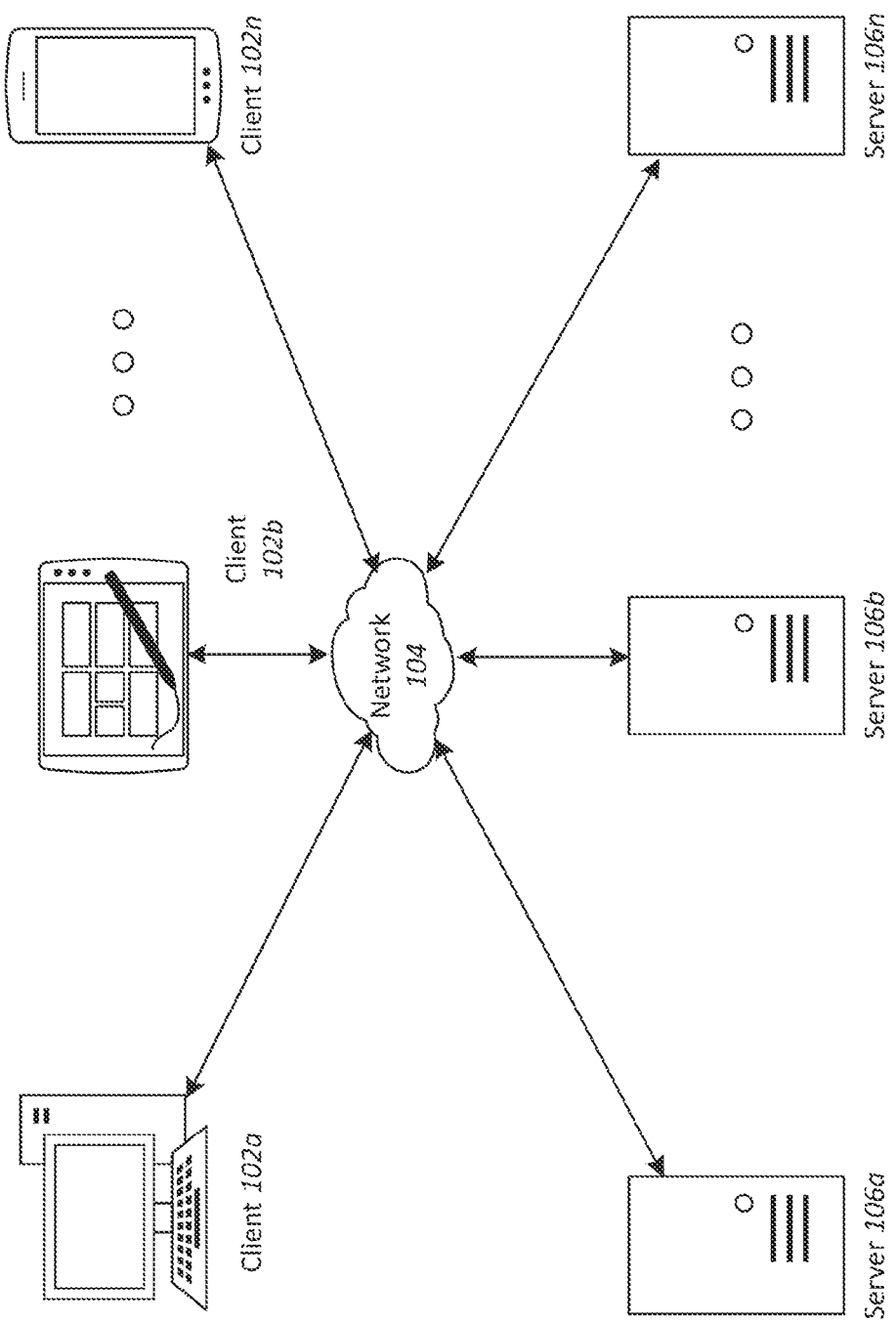
FIG. 1A is a block diagram depicting an embodiment of a network environment comprising a client device in communication with a server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 (not shown) or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
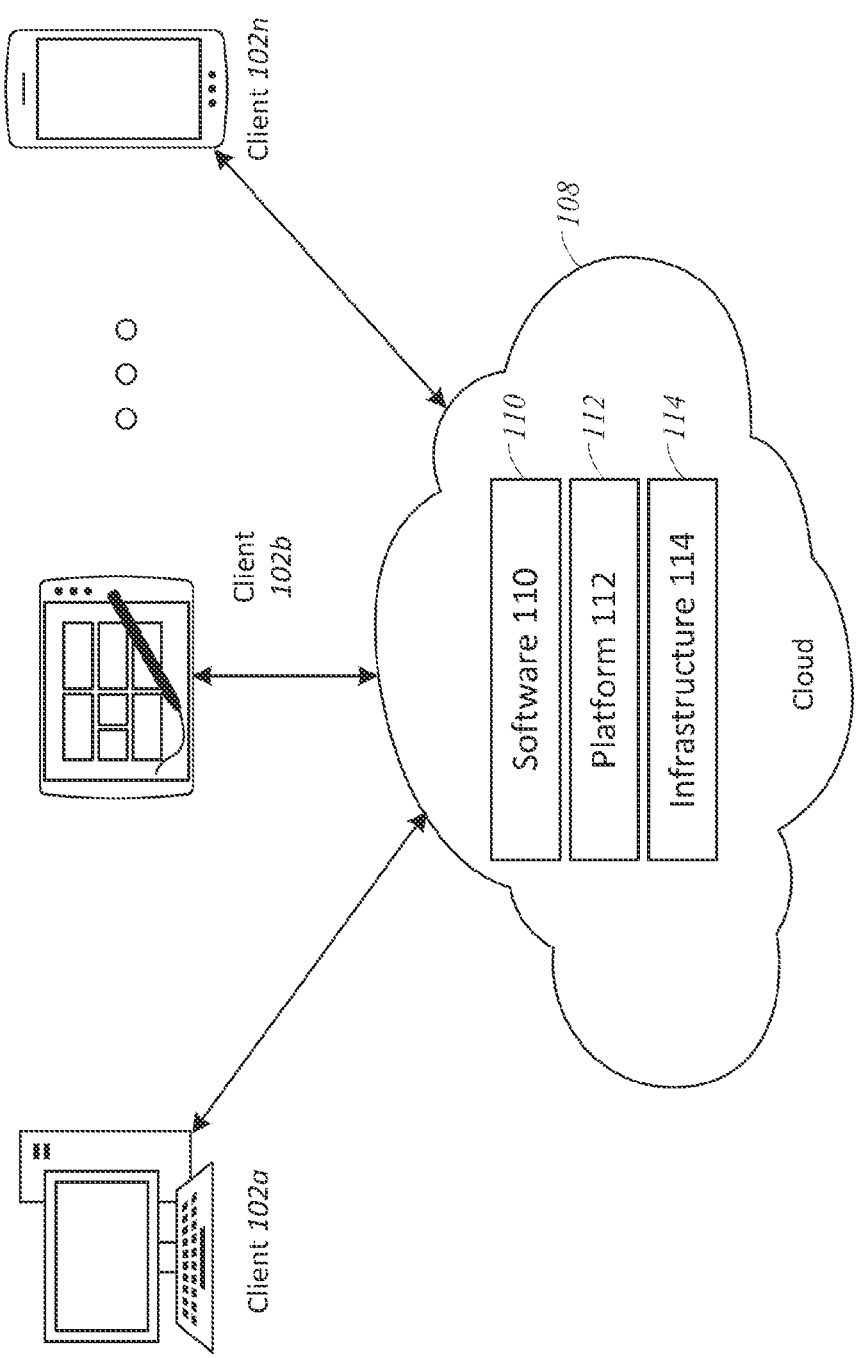
FIG. 1B is a block diagram depicting a cloud computing environment comprising a client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients.

Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
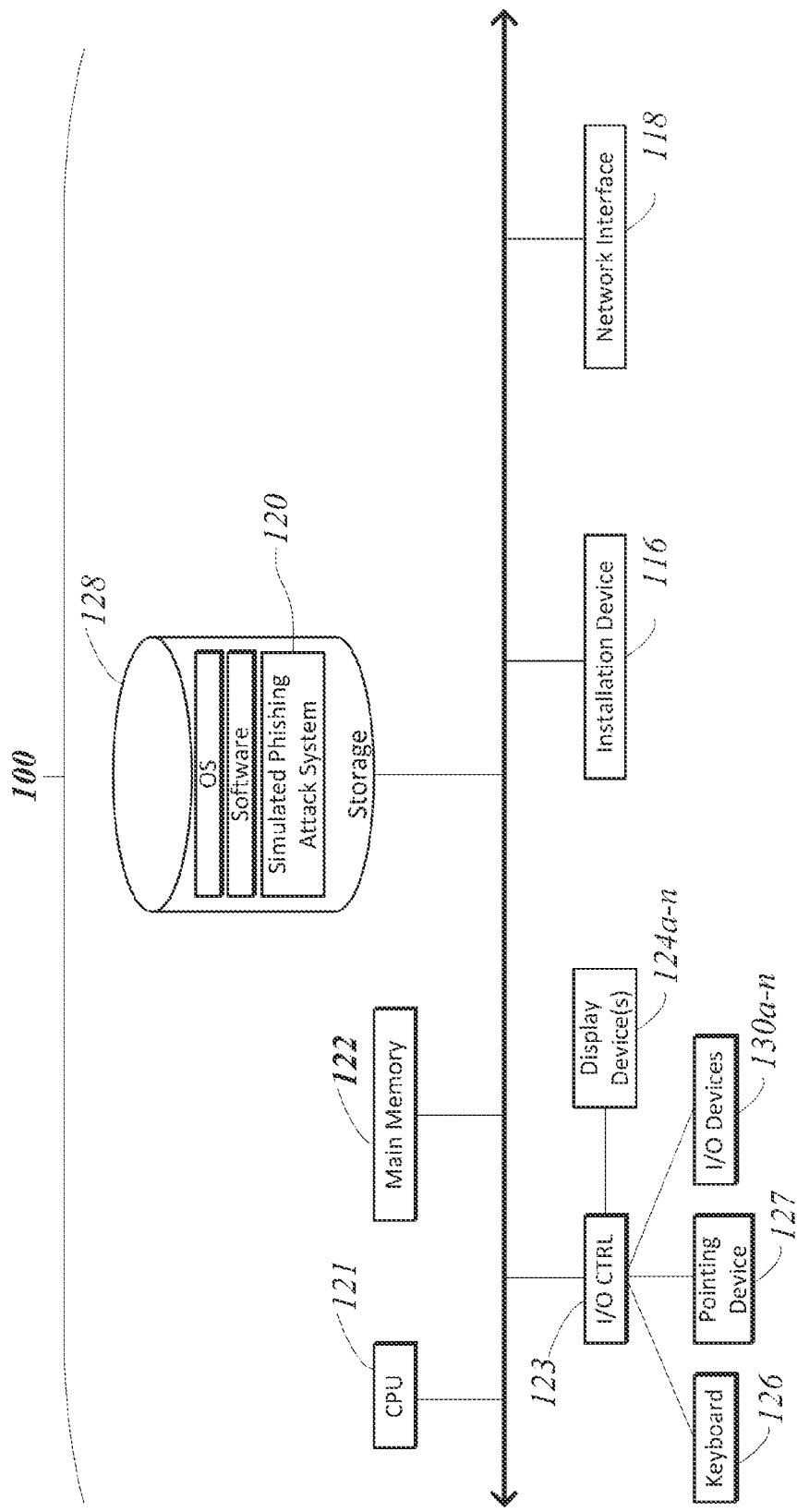
FIGS. 1C and 1D are block diagrams depicting embodiments of computing devices useful in connection with the methods and systems described herein.
Figure 1D:
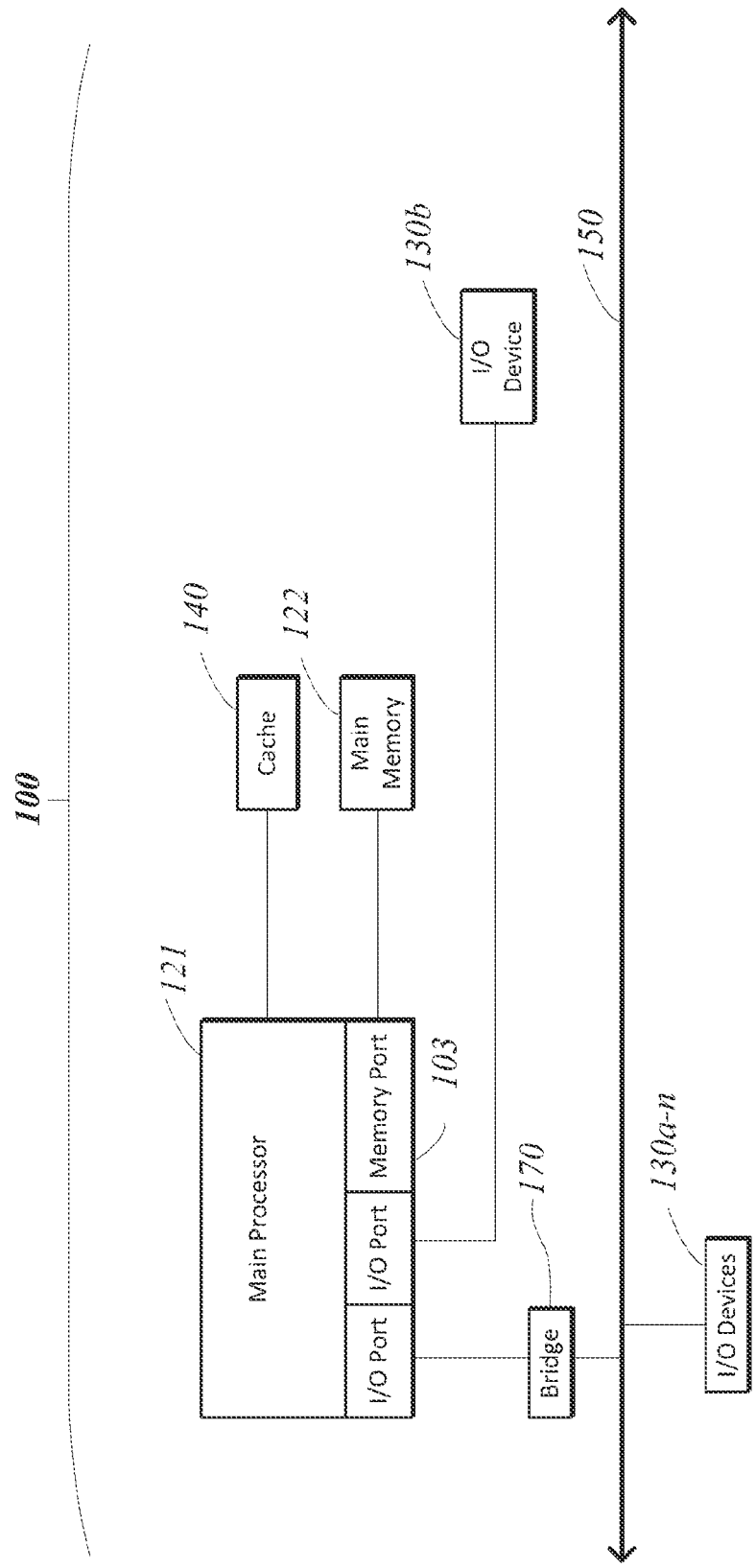

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a simulated phishing attach system 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopic. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the simulated phishing attack system software 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Washington.

In some embodiments, the computing device 100 is a digital audio player such as the Apple IPOD, IPOD Touch, and IPOD NANO lines of devices, manufactured by Apple Computer of Cupertino, California Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods of Performing Simulated Phishing Attacks using Social Engineering Indicators.

This disclosure generally relates to systems and methods for configuring and performing simulated phishing attacks using social engineering based failure indicators. The systems and methods allow for the system administrator to provide immediate feedback and learning opportunities to users who fail the test. The systems and methods further allow the system administrator to add social engineering based failure indicators, also known as failure indicators, into any existing phishing email template, as well as allowing the system administrator to create new templates which include one or more selected failure indicators. The systems and methods further allow the system administrator to customize the message that is sent to the user upon failing a test.

A simulated phishing attack may test the readiness of a security system or users of a system to handle phishing attacks such that malicious actions are prevented. A simulated phishing attack may, for example, target a large number of users, such as employees of an organization. Such an attack may be performed by a party friendly or neutral to the targets of the simulated attack. In one type of simulated phishing attack, an attempt is made to extract sensitive information using phishing methods, and any extracted information is used not for malicious purposes, but as part of a process of detecting weaknesses in security. Performing a simulated phishing attack can help expose a lack of vigilance and/or know-how in a user or set of users of a device in minimizing risk associated with such attacks. User know-how can be improved by providing targeted, real-time training to the user at the time of failing a test provided by a simulated phishing attack.

A method of providing simulated phishing attacks using failure indicators is as follows. A system administrator, who could be a security manager, or a third party on behalf of a security manager, configures an existing phishing email template such that it includes one or more failure indicators. The phishing email template is used to generate simulated phishing emails that can masquerade as an email from a party known to the user, such as an executive of the company that employs the user. In an embodiment, the phishing email template can be used to generate an email that appears to be sent from a party unknown to the user. The email may be designed to appear interesting to the user, and may offer or promise for example access to an interesting tidbit of news, access to useful computer software, access to knowledge of how to perform a money making scheme, or any other thing that may be of interest. In some embodiments, the email may request that the user perform a certain action, such as providing sensitive information by replying to the email, or transferring money to an account owned by the attacker and then sending a reply email to confirm that the money has been transferred. In some embodiments, the system administrator creates a new phishing email template that includes one or more failure indicators.

The system stores the failure indicators and their descriptions in the phishing email template in a way that is visible to the system administrator but invisible to a user or set of users that receive a simulated phishing email based on the phishing email template.

The system transmits a simulated phishing email based on the phishing email template to a user or set of users. A user fails the test by performing an action on the received email. One example of an action indicative of a failed test is sending a reply to or forwarding the received email. Another example of an action indicative of a failed test is clicking on a link in the received email.

If the user fails the test, the system displays to the user a copy of the simulated phishing attack email in which the failure indicators are visible to the user. In some embodiments, upon failing the test, the user is redirected to a landing page to view the copy of the simulated phishing attack email in which the failure indicators are visible. The user may perform an action on the copy of the simulated phishing attack email in which the failure indicators are visible to the user, and that action may reveal failure text which describes how to identify that type of failure indicator.

In some embodiments, the system creates a dashboard which assesses the results of one or more simulated phishing email attack campaigns that use social engineering based failure indicators, and provides information to the system administrator about which failure indicators are resulting in the highest failure rates.

Figure 2:
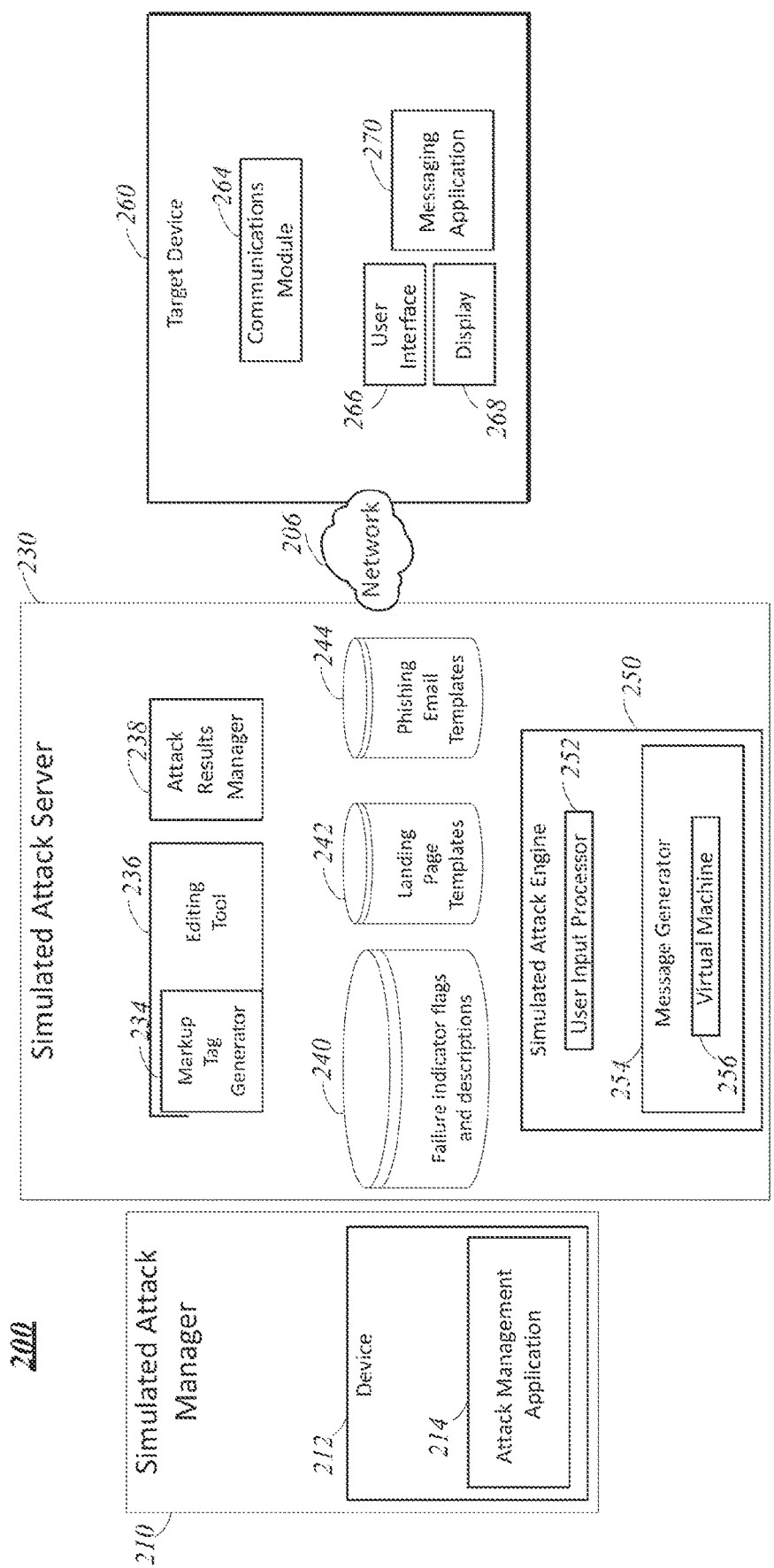
FIG. 2 depicts some of the architecture of an implementation of a system configured to perform a simulated phishing attack with failure indicators utilizing failure indicators supported by custom markup tags which are stored inside of a phishing email template.

Referring to FIG. 2 in a general overview, FIG. 2 depicts some of the architecture of an implementation of a system 200 capable of performing simulated phishing attacks using failure indicators.

System 200 includes a simulated attack manager 210. The simulated attack manager 210 includes a device 212 which runs an attack management application 214, which is responsible for executing the simulated phishing campaign. System 200 further includes a simulated attack server 230. In some embodiments, the simulated attack server can be implemented by a device such as the computing device 100 shown in FIGS. 1C and 1D. The simulated attack server 230 further includes an editing tool 236, which includes a markup tag generator 234. The editing tool 236 is used to create phishing email templates and landing pages. The simulated attack server includes several storage modules. Failure indicator flags and descriptions are stored in storage 240. Landing page templates are stored in storage 242. Phishing email templates are stored in storage 244. Phishing email templates and landing page templates may further be associated with specific categories.

Each of the simulated attack manager 210, attack management application 214, markup tag generator 234, editing tool 236, attack results manager 238, simulated attack engine 250, message generator 254, messaging application 270 and communications module 264 may comprise a program, service, task, script, library, application or any type and form of executable instructions or code executable on one or more processors. Any of the simulated attack manager 210, attack management application 214, markup tag generator 234, editing tool 236, attack results manager 238, simulated attack engine 250, message generator 254, messaging application 270 and/or communications module 264 may be combined into one or more modules, applications, programs, services, tasks, scripts, libraries, applications or executable code.

The simulated attack server 230 further includes a simulated attack engine 250 (which may also be referred to as a simulated attacker), which contains a user input processor 252. The simulated attack engine 250 includes a message generator 254, which may be implemented as or contains a virtual machine 256. Responsive to a user input, the simulated attack engine 250 generates a campaign for a simulated phishing attack, including a selected phishing email template and a selected landing page template, in addition to other user input.

In an implementation, system 200 includes a simulated attack server 230. The simulated attack server 230 may be a part of a cluster of simulated attack servers. In some embodiments, tasks performed by the simulated attack server 230 may be performed by a plurality of simulated attack servers. These tasks may be allocated among the cluster of servers by an application, service, daemon, routine, or other executable logic for task allocation.

In some embodiments, the simulated attack server 230 may include a simulated attack engine 250. The simulated attack engine 250 may manage various aspects of a simulated phishing attack. For example, the simulated attack engine 250 may process input from the simulated attack manager 210, may provide access as needed to various applications, modules, and other software components of the simulated attack server 230 to other various applications, modules, and other software components of the simulated attack server 230, may monitor and control timing of various aspects of a simulated attack, may process requests for access to attack results, or may perform other tasks related to the management of a simulated attack.

In some embodiments, the simulated attack engine 250 may include a user input processor 252. The user input processor 252 may receive input from the simulated attack manager 210 using the attack management application 214 to manage a simulated phishing attack. The user input processor 252 may be, for example, a library, application programming interface (API), set of scripts, or any other code that may be accessed by, or executed via a network connection by, or provide callback methods for, the attack management application 214. In some implementations, any of the editing tool 236, the attack results manager 238, and the simulated attack engine 250 can be implemented as a software application configured to execute on one or more processors, such as the CPU 121 shown in FIG. 1C.

In an implementation, the user input processor 252 may be integrated with or coupled to a memory device, such as the memory 122 shown in FIG. 1C. Such a memory device may store data such as parameters and scripts associated with a particular simulated phishing attack, which may be obtained or retrieved from storage, such as a database. In some embodiments, the memory may include any type and form of storage, such as a database or file system. In an example, the memory may store a set of parameters and scripts corresponding to the choices made by a simulated attack manager 210 through an attack management application 214, e.g. as described above, for a particular simulated phishing attack. In some implementations, such information may be stored in memory, as described above. In some other implementations, such information may be stored in non-memory storage. For example, the information may be stored in a non-volatile storage device such as a hard disk drive.

In an implementation, the simulated attack engine 250 includes a message generator 254. The message generator 254 may be integrated with or coupled to a memory (e.g., the memory 122 shown in FIG. 1C) so as to provide the message generator 254 accesses to parameters associated with messaging choices made for a particular simulated attack by e.g. the simulated attack manager 210. The message generator 254 may be integrated with a memory store or other form of storage, such as a database or hard disk drive containing failure indicator flags and descriptions 240. The message generator 254 may be integrated with a memory store containing landing page templates 242. The message generator 254 may be integrated with or coupled to memory or a memory store containing phishing email templates 244. The message generator 254 may be an application, service, daemon, routine, or other executable logic for generating messages. The messages generated by the message generator 254 may be of any appropriate format. For example, they may be email messages, text messages, messages used by particular messaging applications such as, e.g., WhatsApp™, or any other type of message. Message type to be used in a particular attack may be selected by e.g. a simulated attack manager 210 using an attack management application 214. The messages may be generated in any appropriate manner, e.g. by running an instance of an application that generates the desired message type, such as running e.g. a Gmail™ application, Microsoft Outlook™, WhatsApp™, a text messaging application, or any other appropriate application. The messages may be generated by running a messaging application on e.g. a virtual machine 256, or may simply be run on an operating system of the simulated attack server 230, or may be run in any other appropriate environment. The messages may be generated to be formatted consistent with specific messaging platforms, for example Outlook 365, Outlook Web Access (OWA), Webmail, iOS, Gmail client, and so on.

In some embodiments, the message generator 254 can be configured to generate messages having the ability to travers users who interact with the messages to a specific landing page.

In some embodiments, the message generator 254 can be configured to generate a simulated phishing email. The email can appear to be delivered from a trusted email address, such as the email address of an executive of the company at which the target is employed. In addition, the email can have a "Subject:" field that is intended to be cause the user to take an action, such as initiating a wire transfer. In some embodiments, the message generator 254 can generate multiple instances of the email which may be delivered to multiple users, such as a subset of all of the employees of the company. For example, the simulated attack manager 210 can select any number of employees who should be targeted by a simulated attack, and parameters corresponding to the identities of the selected targets can be stored in a memory or non-memory storage device. The message generator 254 can retrieve this information from the memory and can generate a set of emails similar to the email, each addressed to a respective target identified in the information stored in the memory or non-memory storage device. That is, the message generator 224 can generate the emails such that the "From:" and "Subject:" fields of each email are identical, while the "To:" field is adjusted according to the desired targets.

In some implementations, the simulated attack server 230 can be configured to create one or more phishing campaigns, which may be defined as a series of simulated phishing emails sent to one or more users. For example, a campaign may target an entire group of users (e.g., all employees having a particular role within the entity conducting the simulated phishing campaign). The campaign also may send more than one email to each user. For example, in some implementations, the simulated attack server 230 can send phishing emails to targeted users on a scheduled or periodic basis (e.g., weekly, monthly, or quarterly) over the course of the campaign. In some implementations, a system administrator may configure the timing and scheduling of such emails throughout the campaign by selecting a start time, an end time, and a frequency with which emails should be sent to targeted users.

In some implementations, the system administrator also can configure other aspects of the campaign, such as a difficulty rating relating to the level of sophistication of the phishing campaign. For example, a higher degree of difficulty may include emails having failure indicators that are less obvious or apparent to users, thereby increasing the probability that the users will interact with the failure indicators. In some implementations, the system administrator also can configure a simulated phishing campaign based on a category. A category can relate to the type of failure indicator or exploit included within an email of the simulated phishing campaign. For example, one category may include emails having links to potentially malicious landing pages, while another category may include emails having attachments which may perform a malicious action when opened or viewed on the target device 260.

The type of exploit may depend in part on the type of failure indicator. For example, a failure indicator including a link that directs a user to a landing page may include an exploit in the form of executable code such as a Java applet that runs on the landing page. Such an applet can be configured to perform malicious actions such as the unauthorized collection of user data from the user who views the web page. An example of an interface for creating such an applet, as well as the types of information that can be collected by the applet, is described further below in connection with FIG. 18. Other types of exploits can include computer code that is installed and/or executed on the target device 260 when a user opens an attachment of an email. Like a Java applet, such code also can be configured to collect user data and to transmit the collected data back to the simulated attack server 230 via the network 206. In some implementations, an exploit may be included directly within an email itself. For example, an email of simulated phishing campaign can include tracking code configured to track actions of a user, such as whether the user opened or viewed the email.

The simulated attack server 230 comprises an editing tool 236, also sometimes referred to as an editor or editing tool. A system administrator, who could be a security manager, or a third party on behalf of a security manager, uses the editing tool 236 to create and configure simulated phishing email templates, as well as to modify existing simulated phishing email templates to include one or more failure indicators. Failure indicators can be placed in several locations in a phishing email template. For example, the sender, subject, content, attachments, and links in an email may all contain social engineering threats represented by failure indicators. The overall context of the email may also be an indicator of a social engineering threat. The phishing email template is used to generate emails that can masquerade as an email from a party known to the user, such as an executive of the company that employs the user. In an embodiment, the template can be used to generate an email that appears to be sent from a party unknown to the user. The email may be designed to appear interesting to the user, and may offer or promise for example access to an interesting tidbit of news, access to useful computer software, access to knowledge of how to perform a money making scheme, or any other thing that may be of interest. In some embodiments, the email may request that the user perform a certain action, such as providing sensitive information by replying to the email, or transferring money to an account owned by the attacker and then sending a reply email to confirm that the money has been transferred.

The editing tool 236 may include a what-you-see-is-what-you-get (WYSIWYG) editor. The WYSIWYG editor provides the system administrator with simple, visual tools to create phishing email templates that include failure indicators. The editing tool 236 may include a source code editor that can be used to create the phishing email template.

Within the editing tool 236 is a markup tag generator 234. A markup tag for a social engineering based failure indicator may have the source code format:

<x-sei title="This would be the text displayed">Financial</x-sei>

The word "Financial" is the phishing text that will be displayed in an email that is generated using the message generator 254 through use of a virtual machine 256, and the same word is marked with a failure indicator in the phishing email template. The failure indicator is shown in the phishing email template with a flag that appears next to the text that gets displayed in an email. The text "This would be the text displayed" is the instructional message associated with the failure indicator. The instructional message would get displayed to a user who failed the simulated phishing attack and who interacts with the flag in the copy of the phishing email template that gets displayed.

One example of a social engineering based failure indicator, sometimes generally referred to as a social engineering indicators or failure indicators, is incorrect or falsified sender information. Some of the instructional messages related to the sender field are as follows:

Were you expecting an email from this sender?
Do you know this sender?
Do you receive requests like this from this sender?
Sender email address is from your organization, but could be spoofed.
Email domain is strange or suspicious.
Email domain is spoofing a popular website.
Email domain is misspelling of a popular website.

Another example of a social engineering based failure indicator is incorrect or falsified subject information. Some of the instructional messages related to the subject field are as follows:

Subject line doesn't match the content of email.
Subject line shows a "reply" to something you never sent or requested.
Subject line shows the message was forwarded to you, but the content doesn't apply to you.

Another example of a social engineering based failure indicator is incorrect or falsified content information. Some of the instructional messages related to the message content are as follows:

Tells you to click a link to avoid a negative consequence.
Tells you to open an attachment to avoid a negative consequence.
Tells you that you are required to click on a link.
Tells you that you are required to open the attachment.
Tells you to click a link to gain something of value.
Tells you to provide personal information in a reply.
Spelling error.
Poor grammar.
Alert from news organization that you may not be subscribed to.
Unlikely this message would come to your work email.
Sense of urgency, i.e. "do this now!"
Shocking content to entice you to click link.
Aggressive content to scare you into clicking link.
Shocking content to entice you to open attachment.
Aggressive content to scare you into opening attachment.
Shipping notice for something you didn't purchase.
Receipt for something you didn't purchase.

Another example of a social engineering based failure indicator is incorrect or falsified attachment information. Some of the instructional messages related to the attachment are as follows:

Were you expecting to receive this attachment?
Attachment has enticing title that makes you want to open it.
Does this sender normally send you attachments?
Attachment has a possible dangerous file extension.

Another example of a social engineering based failure indicator is incorrect or falsified link information. Some of the instructional messages related to the link are as follows:

Hover over the link. Link is taking you to a different address than what is shown.
Hover over the link. Link does not take you to the site the email content says it will.

Another example of a social engineering based failure indicator is incorrect overall context of the email. Some of the instructional messages related to the overall context of the email are as follows:

This purports to be from a banking institution—do you get banking notices at this address?
This is a social media platform notice—do you get those notices at this address?

The markup tag generator 234 is used to insert failure indicators into the email template. Once in the email template, the failure indicators are shown as flags. Markup tags can be generated using a modified WYSIWYG editor. WYSIWYG editors known in the art include, for example, Adobe Dreamweaver, Adobe Contributor, Amaya, Microsoft Expression Web, Kompozer, oXygen, and the like. The WYSIWYG editor may be modified to include a button that is used to activate the markup tag generator to insert a failure indicator. In one embodiment the WYSIWYG editor includes a red flag button. Using the modified WYSIWYG editor, the system administrator places the cursor at the point in the email template where they want to insert a failure indicator, and clicks the red flag button, which brings up a popup window which allows the user to enter the phishing text and the instructional message.

The simulated attack server 230 contains storage for failure indicator flags and descriptions 240. The phishing text and corresponding description, whether entered using a source code editor or with a WYSIWYG editor, are stored in the failure indicator flags and descriptions storage 240.

The simulated attack server 230 also contains storage for phishing email templates 244. These templates may be assigned to a category. The message generator 254 in the simulated attack engine 250 uses a phishing email template in order to generate a simulated phishing attack according to a campaign.

The editing tool 236 can also be used to create or to modify landing page templates. A landing page is a page that a user is traversed to if they fail a simulated phishing attack, that is if they interact in some way with the simulated phishing email. The landing page may include a list of the failure indicators that were included in the simulated phishing email. The landing page may show a copy of the simulated phishing email, in which the flags or failure indicators are shown. The landing page may be configured such that a user may interact with the flags or the failure indicators in order to see the description corresponding to a failure indicator flag. The landing page may include description related to generic flags, which may for example be displayed at the bottom of the copy of the simulated phishing email or outside of the copy of the simulated phishing email. Landing page templates are stored in the landing page template storage 242.

In an implementation, a simulated attack manager 210 may be e.g., a security manager, a third party security consultant, a risk assessor, or any other party. The simulated attack manager 210 may wish to direct a simulated phishing attack by interacting with a simulated attack server 230 through an attack management application 214 installed on a device 212. The device 212 may be, for example, a desktop computer, a laptop computer, a mobile device, or any other suitable computing device. The attack management application 214 may be e.g., an application on a device that allows for a user of the device to interact with the simulated attack server 230 for e.g. purposes of tailoring and/or executing a simulated phishing attack and/or viewing and/or processing and/or analyzing the results of a phishing attack.

In an implementation, the attack management application 214, when executed on the device 212, causes a graphical user interface to be displayed to the simulated attack manager 210. In other embodiments, the attack management application 214 allows for user input through a non-graphical user interface, such as a user interface that accepts text or vocal input without displaying an interactive image. A graphical user interface may be displayed on a screen of a mobile phone, or a monitor connected to a desktop or laptop computer, or may be displayed on any other display. The user may interact with e.g. the graphical user interface on the device by typing, clicking a mouse, tapping, speaking, or any other method of interacting with a user interface. The graphical user interface on the device may be a web-based user interface provided by a web browser (e.g. GOOGLE CHROME, Microsoft INTERNET EXPLORER, or Mozilla Firefox provided by Mozilla Foundation of Mountain View, California), or may be an application installed on a user device capable of opening a network connection to simulated attack server 230, or may be any other type of interface.

In an implementation, the simulated attack manager 210 may make choices concerning how a simulated phishing attack is to be carried out. For example, a graphical user interface run by the attack management application 214 may be displayed to the simulated attack manager 210 on a display of the device 212. The simulated attack manager 210 may input parameters for the attack that affect how it will be carried out. For example, the simulated attack manager 210 may make choices as to which users to include as potential targets in the attack, the method of determining which users are to be selected as targets of the attack, the timing of various aspects of the attack, whether to use an attack template that includes values for one or a plurality of failure indicators, how responses from targeted users should be uniquely identified, and other choices. These choices may be made by selecting options displayed on a graphical user interface from dropdown menus, being presented with choices through a simulated attack wizard, or in any other appropriate manner. An example of such a graphical user interface is described further below in connection with FIG. 18.

In some implementations, the simulated attack server 230 can carry out a phishing campaign, which may send a series of emails to one or more users according to a set of rules selected by a system administrator. For example, the rules associated with a campaign may determine the timing, scheduling, and frequency of emails sent during the campaign, as well as the set of users to whom the emails are sent.

In some implementations, the campaign may have an associated difficulty rating, as described above. For example, selecting a higher degree of difficulty may be expected to result in a larger percentage of users interacting with one or more failure indicators included within the phishing campaign, which may lead to better education of the users targeted during the campaign. The system administrator also can select a phishing link domain for a landing page associated with the phishing campaign, such as web page that is displayed after a user selects a link in an email of the campaign. The system administrator can select the domain to resemble a domain associated with a trusted entity to increase the probability that the user will perform certain actions (e.g., entering a username or password) on the landing page. The system administrator also can add one or more exploits within the phishing campaign. An exploit may be malicious behavior of any sort performed without the authorization or awareness of the target. For example, an exploit may perform unauthorized collection of user data as a result of a user interacting with one or more failure indicators in the phishing campaign.

As described above, exploits can include applications or Java applets that execute on a landing page of the campaign, as well as computer code included within the body of the phishing email of within an attachment to the phishing email. An example of configuring a Java applet exploit is described further below in connection with FIG. 18.

In some implementations, the system administrator also can choose to add "clickers" (i.e., targeted users who interact with one or more failure indicators of a phishing email in the campaign) to a selected group. The group may be formed by adding an indication of each such user to a data structure, so that the group of users who fell victim to the phishing campaign can be quickly and easily identified. In some implementations, a campaign may target an entire group of users (e.g., all employees having a particular job title or role within the entity conducting the simulated phishing campaign). The campaign also may send more than one email to each user. For example, in some implementations, the simulated attack server 230 can send phishing emails to targeted users on a scheduled or periodic basis (e.g., weekly, monthly, or quarterly) over the course of the campaign.

In an implementation, the attack management application 214 may allow the simulated attack manager 210 to access and/or change settings of an account maintained with any party involved with the attack, such as, for example, a third party security service provider, or may allow the attack management application 214 to access and/or change settings of an account maintained with a third party security service provider, such as one that e.g. manages an exploit server, view bills and/or make payments to a third party security service provider, to perform these functions with other third parties involved in the attack, or provide any other functions that would be appropriate for facilitating communications between the simulated attack manager 210 and any other parties involved in the attack.

The system 200 includes also the target device 260. A target may be any target of a simulated phishing attack. For example, the target may be an employee, member, or independent contractor working for an organization that is performing a security checkup or conducts ongoing simulated phishing attacks to maintain security. The target device 260 may be any device used by the target. The target need not own the device for it to be considered a target device 260. The target device 260 may be any computing device, such as a desktop computer, a laptop, a mobile device, or any other computing device. In some embodiments, the target device 260 may be a server or set of servers accessed by the target. For example, the target may be the employee or a member of an organization. The target may access a server that is e.g. owned or managed or otherwise associated with the organization. Such a server may be a target device 260.

In some embodiments, the target device 260 can be implemented by a device such as the computing device 100 shown in FIGS. 1C and 1D. Thus, the target device 260 can include a processor, such as the CPU 121 shown in FIG. 1C and a memory or other form of storage device, such as the memory 122 shown in FIG. 1C. In some implementations, the memory may include any type and form of storage, such as a database or file system, or a non-volatile storage device such as a hard disk drive. The target device 260 may further include a user interface 266 such as a keyboard, a mouse, a touch screen, or any other appropriate user interface. This may be a user interface that is e.g. connected directly to a target device 260, such as, for example, a keyboard connected to a mobile device, or may be connected indirectly to a target device 260, such as, for example, a user interface of a client device used to access a server target device 260. The target device 260 may include a display 268, such as a screen, a monitor connected to the device in any manner, or any other appropriate display.

In an implementation, the target device 260 may include a messaging application 270. The messaging application 270 may be any application capable of viewing, editing, and/or sending messages. For example, the messaging application 270 may be an instance of an application that allows viewing of a desired message type, such as any web browser, a Gmail™ application, Microsoft Outlook™, WhatsApp™, a text messaging application, or any other appropriate application. In some embodiments, the messaging application 270 can be configured to display simulated phishing attack emails. Furthermore, the messaging application 270 can be configured to allow the target to generate reply messages or forwarded messages in response to the messages displayed by the messaging application 270.

In some embodiments, the target device 260 may include a communications module 264. This may be a library, application programming interface (API), set of scripts, or any other code that may facilitate communications between the target device 260 and any of the simulated attack server 230, a third party server, or any other server. In some embodiments, the communications module 264 determines when to transmit information from the target device 260 to external servers via a network. In some embodiments, the information transmitted by the communications module 264 may correspond to a message, such as an email, generated by the messaging application 270.

In some embodiments, the simulated attack server 230 includes an attack results manager 238. This attack results manager 238 analyzes which phishing email templates are most effective in generating user failures when the template is used in a simulated phishing attack. The attack results manager 238 additionally determines what the most common failure types are for a given template. The attack results manager 238 may perform additional analysis across many different template uses to determine which failure indicators lead to the highest rate of failures. In some implementations, the attack results manager 238 can be configured to receive results of a simulated phishing campaign. For example, the simulated phishing campaign can include one or more exploits, such as a java applet that executes on a landing page displayed as a result of a user selecting a link within an email of the simulated phishing campaign. In some implementations, such an exploit can be configured to transmit the collected information to the attack results manager 238, so that the attack results manager 238 can have access to the results of the simulated phishing campaign. In some implementations, an email of simulated phishing campaign can include executable code that relays information, such as an indication of whether a user selected an item within the email, to the attack results manager 238 even without the need for a landing page to be displayed to the user. For example, such code could be used to provide an indication of whether the user viewed the email or opened an attachment included in the email. The attack results manager 238 can process the information received from the one or more exploits to determine information such as the set of users who interacted with a failure indicator of the simulated phishing campaign and the types of data that were collected during the simulated phishing campaign.

For example, the attack results manager 238 may include data collected from targets, records of failures such as a listing of which targets replied to a simulated phishing email, systemic or other security measures in place during the simulated phishing attacks, time or date logs, user identifiers, data detailing the results or analysis of attack results including data that indicates associations between attack results, and any other appropriate data. The attack results manager 238 may be integrated with the attack management application 214 such that the simulated attack manager 210 may view, save, share, print, or perform any other appropriate action with the attack results. The attack results manager 238 may perform analysis on the attack results, possibly upon request of the simulated attack manager 210. For example, this analysis may include determining which users are a security risk based on having a number of failures above a predetermined threshold, whether certain security systems in place are effective by e.g. correlating the presence of such security systems with a lower than average incidence of failures. The attack results manager 238 may allow an attack manager to view, on a graphical user interface run by the attack management application 214, such as for example a timeline of overall failure rates, which may be useful in helping to determine whether a security policy that was instituted at a particular time was effective in improving security.

The attack results manager can be configured to receive various types and forms of data collected by one or more exploits of a simulated phishing campaign. For example, an exploit can collect user data such as information relating to current and recently logged on users or realtime user screen captures from the target device 260. In some implementations, an exploit can collect network information such as network details, a system hostfile, and active TCP sessions. In some implementations, an exploit can collect system information from the target device 260, such as information relating to the currently running applications and/or currently running services. In some implementations, an exploit can collect lightweight directory access protocol (LDAP) information from the target device 260, such as domain user details, active directory computers, active directory service principal names, and active directory comments password search. In some implementations, an exploit can collect additional device information, such as information relating to a printer coupled to the target device 260. The combination of selected data types for an exploit to collect can differ across various phishing campaigns (or across various users within a single phishing campaign) according to the preferences of the system administrator.

In some embodiments, reply emails sent from the target device 260 to the simulated attack server 230 can be processed by the simulated attack engine 250. For example, the simulated attack engine 250 can be configured to process reply emails received from one or more target devices 260 to determine the identities of the targets who sent the reply emails. In some embodiments, the identities of the targets may be determined based in part on the unique identifiers included within each reply email received by the simulated attack server 230.

In some embodiments, the attack results manager 238 can parse a reply email according to an expected format of the reply email. In some other embodiments, the attack results manager 238 can be configured to parse other portions of a reply email. In some embodiments, the attack results manager 218 can identify the matched target as having failed the test represented by the simulated attack, because the target replied to the simulated phishing attack email. The attack results manager 238 can be configured to record the failure of the target, for example, in the memory.

The system 200 may include a network 206, such as any embodiments of network 104 described herein. The network 206 may be any type and/or form of network. The geographical scope of the network 206 may vary widely and the network 206 can be a body area network (BAN), a personal area network (PAN), a local-area network (LAN), e.g. Intranet, a metropolitan area network (MAN), a wide area network (WAN), or the Internet. The topology of the network 206 may be of any form and may include, e.g., any of the following: point-to-point, bus, star, ring, mesh, or tree. The network 206 may be an overlay network which is virtual and sits on top of one or more layers of other networks 206'. The network 206 may be of any such network topology as known to those ordinarily skilled in the art capable of supporting the operations described herein. The network 206 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 206 may be a type of a broadcast network, a telecommunications network, a data communication network, or a computer network. The network 206 connects the simulated attack server 230 and a target device 260. The target device comprises a communications module 264, a user interface 266, a display 268, and a messaging application 270. The target device 260 receives the email sent by the simulated attack server 230 based upon the campaign created and executed by the simulated attack engine 250. The target device 260 is able to receive the simulated phishing email via the messaging application 270. In some implementations, the messaging application 270 can be configured to execute on a processor included within the target device 260, such as the CPU 121 shown in FIG. 1C. The messaging application also can be coupled to a memory device or other form of storage such as the memory 122 shown in FIG. 1C. The target device 260 can display the received email for the user using the display 268, and is able to accept user interaction via the user interface 266 responsive to the displayed email. If the user interacts with the simulated phishing email, the target device traverses to a display of the social engineering indicators that were in the phishing email template used by the simulated attack engine 250 in the phishing campaign.

Figure 3:
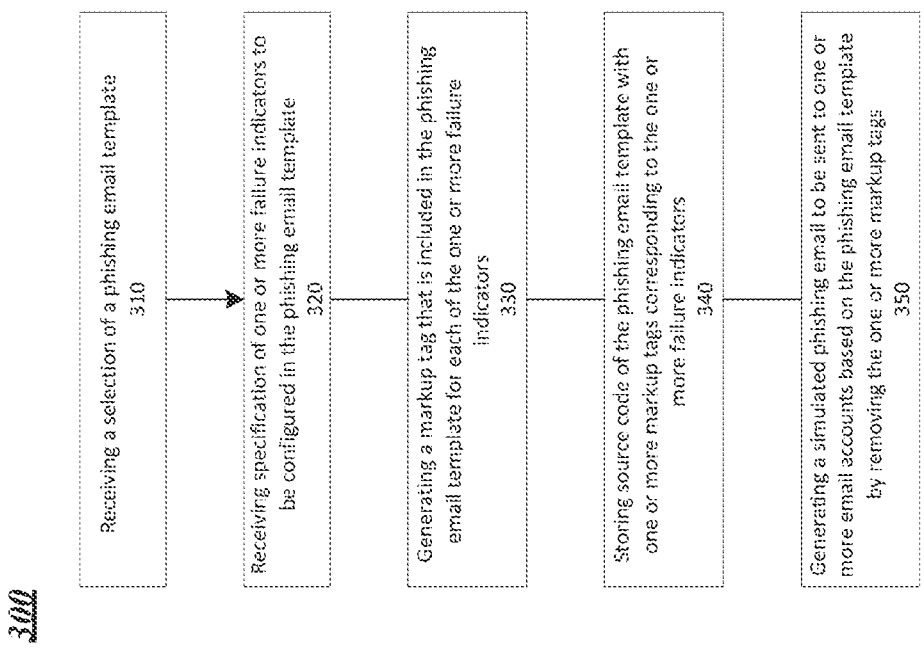
FIG. 3 depicts an implementation of a method for configuring a phishing email template with failure indicators, and generating a simulated phishing email based on the phishing email template but with the failure indicators removed.

Referring to FIG. 3 in a general overview, FIG. 3 depicts an implementation of a method 300 for configuring a phishing email template with failure indicators, and generating a simulated phishing email based on the template. In a brief overview, the method 300 can include receiving, by an editing tool of a simulated attack server, a selection of a phishing email template (step 310). The method can include receiving the specification of one or more failure indicators to be configured in the phishing email template (step 320). The failure indicators may be tied to a specific field, such as the sender's email address, the sender's name, the subject, the attachment filename, and so on. In an embodiment, the failure indicators can be configured to be associated with text to be inserted into the body of the phishing email template. The method can include generating a markup tag that is included in the phishing email template for each of the received failure indicators (step 330). The markup tags are stored in the phishing email template as failure indicators, and they may be shown by a colored flag, by changing the font, the font size or color, by adding bold face, italics, or underline formatting, or any other formatting approach which highlights the failure indicator in the phishing email template. The method can include storing the source code of the phishing email template with one or more markup tags corresponding to the one or more failure indicators (step 340). The method may further include generated a simulated phishing email to be sent to one or more email accounts based on the phishing email template, by removing the one or more markup tags (step 350). Removing the markup tags from the email removes any trace of the failure indicators such that the recipient of the email is not alerted to the fact that the email is part of a simulated phishing attack.

In some embodiments, the simulated attack server may receive a selection of a phishing email templates at step 310 via any type of interface, for example a graphical user interface (GUI), and application program interface (API), or a command line interface (CLI). The interface may be menu driven, or form based, or may be based on natural language processing or may be gesture driven. The phishing email template may be an existing template, or the system administrator may create the phishing email template from scratch. The simulated attack server may receive one phishing email template or may receive more than one phishing email template. In one embodiment, the simulated attack server receives a selection of a phishing email template by enabling, via the editing tool, the creation of a custom phishing email template.

In some embodiments, the simulated attack server receives specification of one or more failure indicators at step 320 through the use of an editing tool. In some embodiments, the failure indicators may be specified using a what-you-see-is-what-you-get (WYSIWYG) editor. In some embodiments, the failure indicators may be specified using a source code editor. In some embodiments, the received failure indicators are social engineering based failure indicators. In some embodiments, the failure indicators may be associated with a word or phrase. In some embodiments, the failure indicators may be associated with an image, with a uniform resource locator (URL), with a header, with a subject, with a sender's name or email address, with a reply-to name or email address, with a domain name, or with an attachment type or filename. In some embodiments, the failure indicator may be generic and associated with the entire message. In one embodiment, the one or more failure indicators is selected from a category of the following categories: sender, subject, content, attachment, link, and overall.

In some embodiments, the simulated attack server generates a markup tag at step 330 through the use of a WYSIWYG editor. In some embodiments, the WYSIWYG editor is modified to include a feature which adds a markup tag to a failure indicator. In some embodiments, a markup tag is generated using a source code editor. In some embodiments, the failure indicator associated with a markup tag is highlighted in the phishing email template using a colored flag. In some embodiments, the failure indicator associated with a markup tag is highlighted in the phishing email template using an underscore, or using highlighting, or using bold or italics fonts. In one embodiment, the markup tag is generated so as to be included in one of a field of the phishing email template or a body of the phishing email template. In one embodiment, the markup tag is generated to be self-terminating. In one embodiment, the markup tag is generated to encapsulate one of a text or an image. In one embodiment, the markup tag is generated to be a hypertext markup language tag comprising a predetermined name and one or more attributes to specify how the flag is to be displayed.

In some embodiments, at step 340, the simulated attack server stores the source code of the phishing email template with one or more markup tags corresponding to one or more failure indicators in a main memory unit. In one embodiment, the source code of the phishing email template is stored in cache memory. In one embodiment, there is a dedicated memory area for storing phishing email templates. In one embodiment, the source code of the phishing email template is stored based on a selected category.

At step 350 the simulated attack server generates a simulated phishing email to be sent to one or more email accounts. In one embodiment, the simulated phishing email is generated by the message generator. In one embodiment, the simulated phishing email is generated and immediately sent to one or more email addresses. In one embodiment, the simulated phishing email is generated and is stored to be sent to one or more email addresses at a later time, or at a prescheduled time. In one embodiment, the simulated phishing email is generated using a stored phishing email template. In one embodiment, the simulated phishing email is generated to include a link to a display of a copy of the simulated phishing email with the one or more flags of the markup tags shown.

Figure 4:
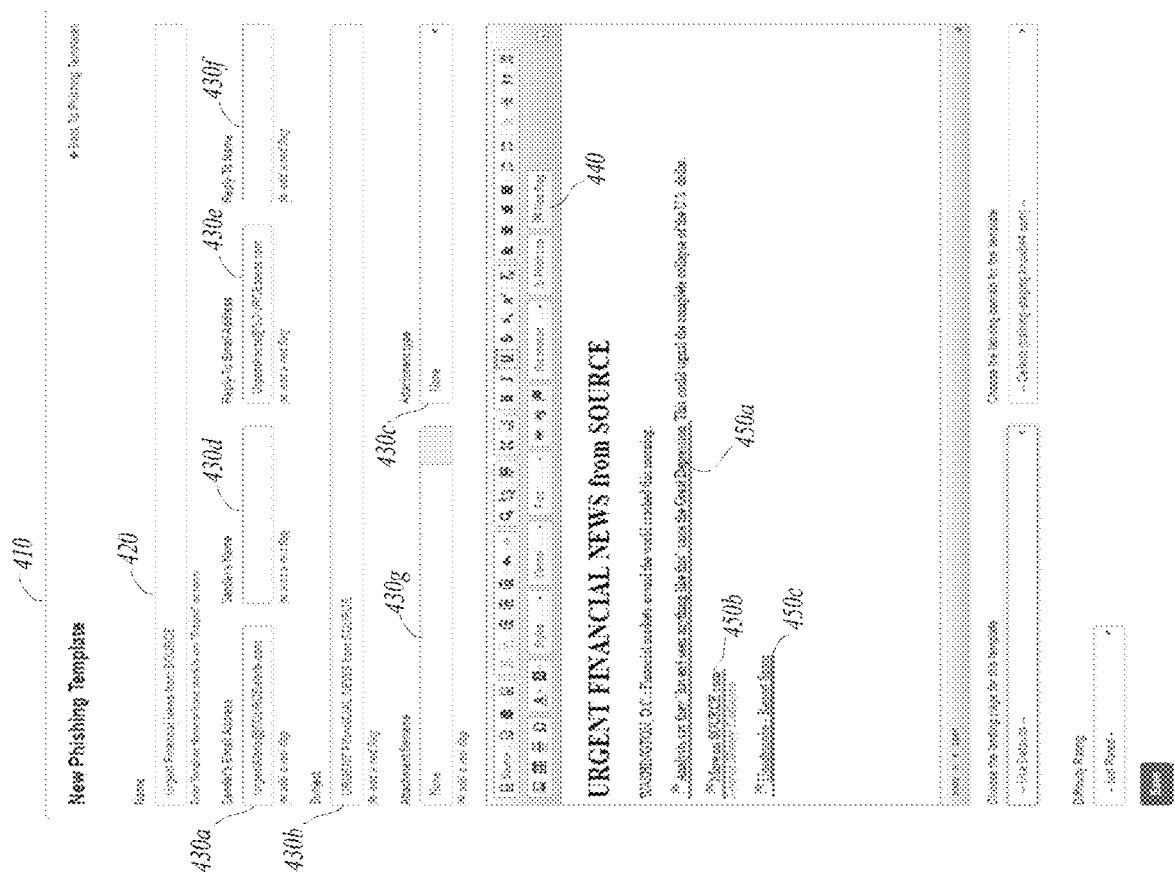
FIG. 4 depicts an example of a WYSIWYG (what you see is what you get) editor which can be used to configure a phishing email template with failure indicators.

FIG. 4 illustrates the creation or modification of a phishing email template 410 that is configured to include failure indicators, such as social engineering based failure indicators, using a modified WYSIWYG editor. Within the editor, there may be several fields that the user can modify, some of which are illustrated in the phishing email template shown in FIG. 4, but it is understood that not all of these fields are mandatory, and additional fields may also be present. The name field 420 is where the name of the email template can be configured, such that the email template can be easily found and reused at a later date. Several fields related to the email can be configured, and any or all of them can be configured to apply a failure indicator. The sender's email address 430a can be entered into the template, and a failure indicator may be added by clicking on the "add a red flag" indicator below the field. Similarly, the subject 430b can be entered into the template, and a failure indicator may be added by clicking on the "add a red flag" indicator below the field. The same process can be done for the attachment type 430c, the sender's name 430d, the reply-to email address 430e, the reply-to name 430f, and the attachment filename 430g.

The modified WYSIWYG editor further allows the configuration of failure indicators, such as social engineering based failure indicators, into the body of the email. The editor is modified to include a "red flag" button 440, which when clicked brings up a pop up which allows the adding or editing of falsified information text and flag descriptions. Examples of failure indicators shown in the body of the email template are given in 450a, 450b, and 450c.

In some implementations, the email template 410 can be saved and accessed at a later time. For example, the email template 410 can be created via the editing tool 236 of the simulated attack server 230 shown in FIG. 2, and can be stored in memory or another form of storage by the simulated attack server 230. The message generator 254 of the simulated attack server 230 can then receive, retrieve, or otherwise access the stored email template 410 to generate the message to be sent to the target device 260 as part of a simulated phishing campaign. Example editors and interfaces for creating or editing a phishing campaign, which may make use of the email template 410, are described further below in connection with FIGS. 15-18.

Figure 5:
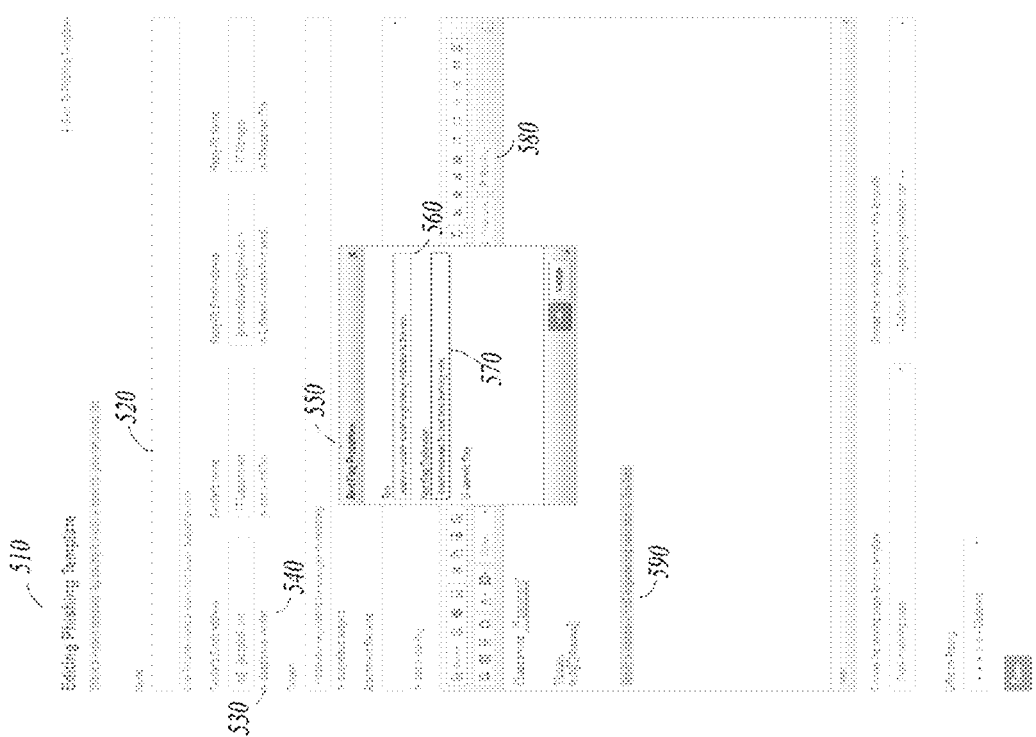
FIG. 5 depicts an example of a red flag properties pop up box on a WYSIWYG editor used for configuring a phishing email template with failure indicators, where the red flag text and red flag explanation can be edited.

FIG. 5 shows a pop up box or user interface which allows the adding or editing of falsified information text and flag descriptions. The modified WYSIWYG editor may be used to modify the phishing email template 510, which can be given a specific name 520. Red flags 530 are used to attach failure indicators, such as social engineering based failure indicators, to fields, and the description is displayed on the template below those fields 540. For inserting failure indicators in the body of the email, text may be entered into the editor in the body of the email and then highlighted with the cursor 590. When the system administrator clicks on the red flag button 580, a red flag properties pop up window 550 appears. In this window, the system administrator can see the highlighted text 560 and may make changes to it. Additionally, the system administrator can create description text 570 in the red flag explanation field of the pop up window.

Figure 6:
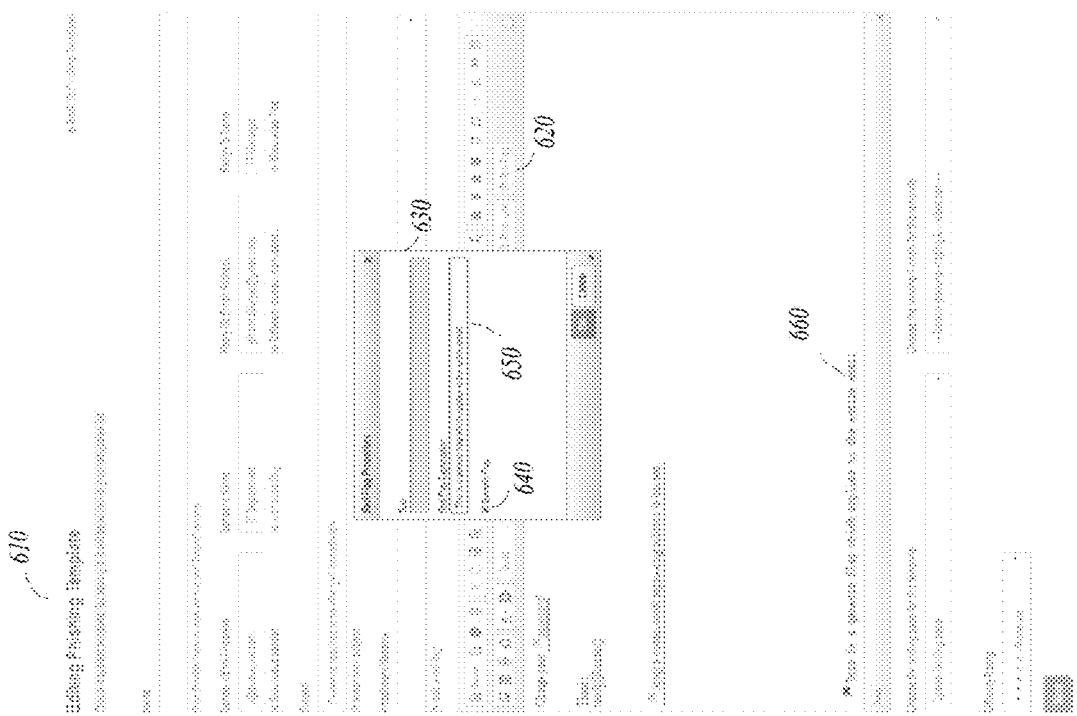
FIG. 6 depicts an example of a red flag properties pop up box on a WYSIWYG editor used for configuring a phishing email template with a generic failure indicator which is applicable to the entire email instead of specific text within the email.

FIG. 6 shows a pop up box or user interface which allows the adding or editing of generic messages about the email as a whole. The modified WYSIWYG editor may be used to modify the phishing email template 610. For inserting a generic flag in the body of the email, the system administrator clicks on the red flag button 620, a red flag properties pop up window 630 appears. In this window, the system administrator can check the generic flag checkbox 640. Next, the system administrator can create description text 650 in the red flag explanation field of the pop up window. When the system administrator clicks OK, the generic flag 660 appears across the bottom of the email template.

Figure 7:
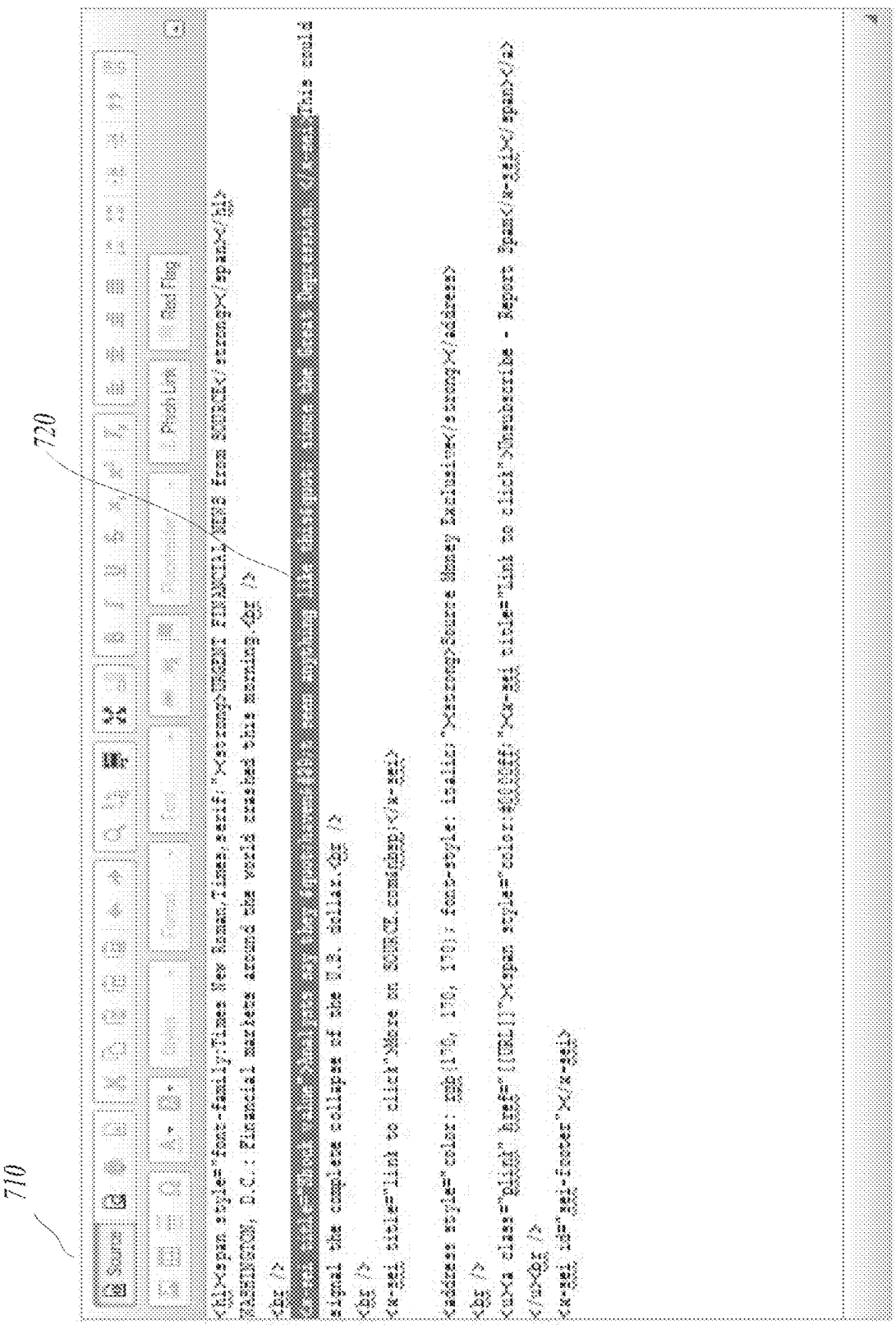
FIG. 7 depicts an example of a source code editor which can be used to configure a phishing email template with failure indicators.

FIG. 7 illustrates an embodiment of switching to the source code editor for the phishing email template. The system administrator may switch to source view by clicking on the source button 710 on the top left hand side of the modified WYSIWYG editor. The markup tag 720 for the failure indicator is embedded directly in the source code.

Figure 8:
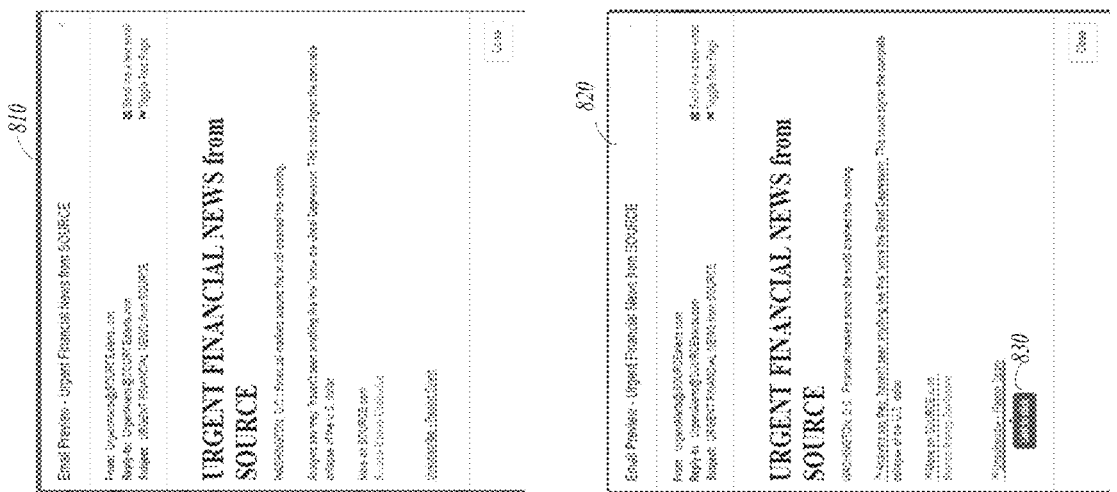
FIG. 8 depicts an implementation of a preview view of a simulated phishing email message with the failure indicators hidden, as it will be seen by the recipient of the email, and a preview view of a simulated phishing email message with the failure indicators shown and one failure description highlighted.

FIG. 8 shows an embodiment of a phishing email 810 generated from a phishing email template. The phishing email 810 has all the markup tags removed so that the recipient of the email cannot see them. In contrast, the copy of the phishing email 820 shows the markup tags in the form of failure indicators. In one embodiment, the failure indicators are highlighted with a colored flag. In one embodiment, the falsified information is underlined. In one embodiment, when the user interacts with the copy of the phishing mail 820, for example by hovering over the failure indicator with a mouse or a pointer, the description text is displayed for the user.

Figure 9:
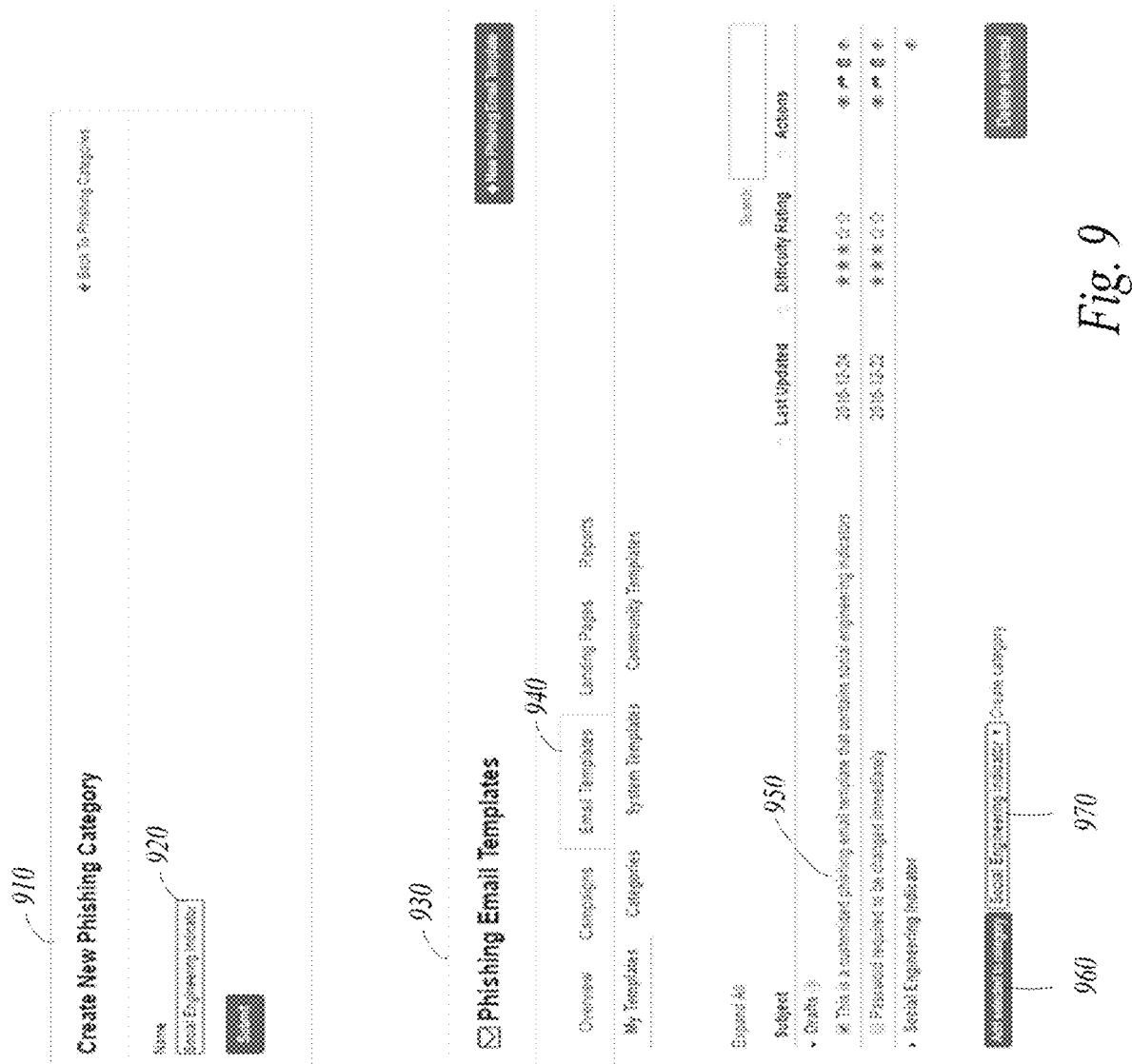
FIG. 9 depicts an example of creating a new phishing category for social engineering indicators, and adding a phishing email template to the new social engineering indicator phishing category.

FIG. 9 illustrates the creation of a new phishing category 910. The system administrator can create any number of new phishing categories to store phishing email templates. The name of the new phishing category is given 920, and the system administrator clicks on submit to create this new category. Once the category is created, phishing email templates can be associated with the new category. In one embodiment, in a phishing email template screen 930, all the phishing email templates 950 are shown to the system administrator by selecting the email templates tab 940. In an embodiment, the system administrator may select one or more templates by checking the box beside the template name. The system administrator may select an existing category 970, or may create a new category. Once the desired category is selected, the system administrator may add the one or more selected email templates to the category 960.

Figure 10:
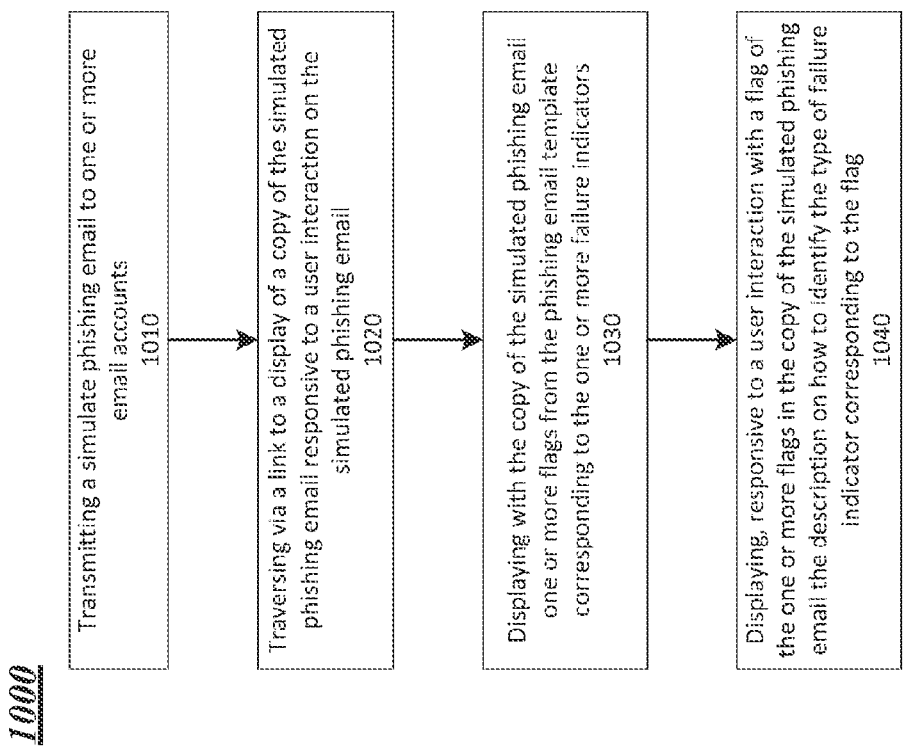
FIG. 10 depicts an implementation of a method for transmitting a simulated phishing email that contains one or more failure indicators to one or more email accounts, and traversing to and displaying a copy of the simulated phishing email responsive to an interaction by a user of the one or more email accounts, and further displaying a description on how to identify the type of social engineering indicators corresponding to a failure indicator in the copy of the simulated phishing email, responsive to a user interaction with the failure indicator.

Referring to FIG. 10, in a general overview, the method can include transmitting a phishing email with failure indicators, such as social engineering based failure indicators, to one or more email accounts (step 1010), traversing via a link to a display of a copy of the simulated phishing email responsive to a user interaction on the simulated phishing email (step 1020), displaying with the copy of the simulated phishing email one or more flags from the phishing email template corresponding to the one or more failure indicators (step 1030), and displaying, responsive to a user interaction with a flag of the one or more flags in the copy of the simulated phishing email, the description on how to identify the type of failure indicator corresponding to the flag (step 1040).

In one embodiment, at step 1010, the simulated attack server transmits a simulated phishing email based on a phishing email template to one or more users. In one embodiment, in the phishing email the markup tags are removed and are therefore not visible to the recipient of the email.

In one embodiment, traversing via a link (step 1020) comprises receiving a click on a portion of the simulated phishing email corresponding to the failure indicator. In one embodiment, traversing via a link comprises receiving a click on a uniform resource locator (URL) within the simulated phishing email corresponding to a failure indicator. In one embodiment, traversing via a link comprises the user replying to the phishing email or forwarding the phishing email. In one embodiment, traversing via a link comprises directing the user to a landing page that embeds the copy of the simulated phishing email with one or more flags highlighted.

In one embodiment, displaying with the copy of the simulated phishing email one or more flags from the phishing email template (step 1030) comprises highlighting the flag of the failure indicator that was interacted with in the simulated phishing email.

In one embodiment, displaying, responsive to a user interaction with a flag of the one or more flags in the copy of the simulated phishing email (step 1040) comprise displaying the description in one of a pop up box or overlay responsive to a pointer hovering over the flag. In one embodiment, step 1040 comprises displaying the description in one of a pop up box or an overlay once the copy of the simulated phishing email is displayed to the user. In one embodiment, step 1040 comprises listing the descriptions of all the failure indicators when the coy of the simulated phishing email is displayed to the user. In one embodiment, step 1040 comprises displaying the description on the landing page in response to a click on the flag of one or more of the failure indicators. In one embodiment, the simulated attack server tracks which users of email accounts interacted with the simulated phishing email. In one embodiment, the simulated attack server tracks which users of email click on a link on the simulated phishing email. In one embodiment, the simulated attack server tracks which users of email replied to the simulated phishing email. In one embodiment, the simulated attack server tracks which users of email forward the simulated phishing email. In one embodiment, the simulated attack server tracks which failure indicator was interacted with on the simulated phishing email. In one embodiment, the simulated attack server tracks the one or more failure indicators associated with the simulated phishing email that the user interacted with.

Figure 11:
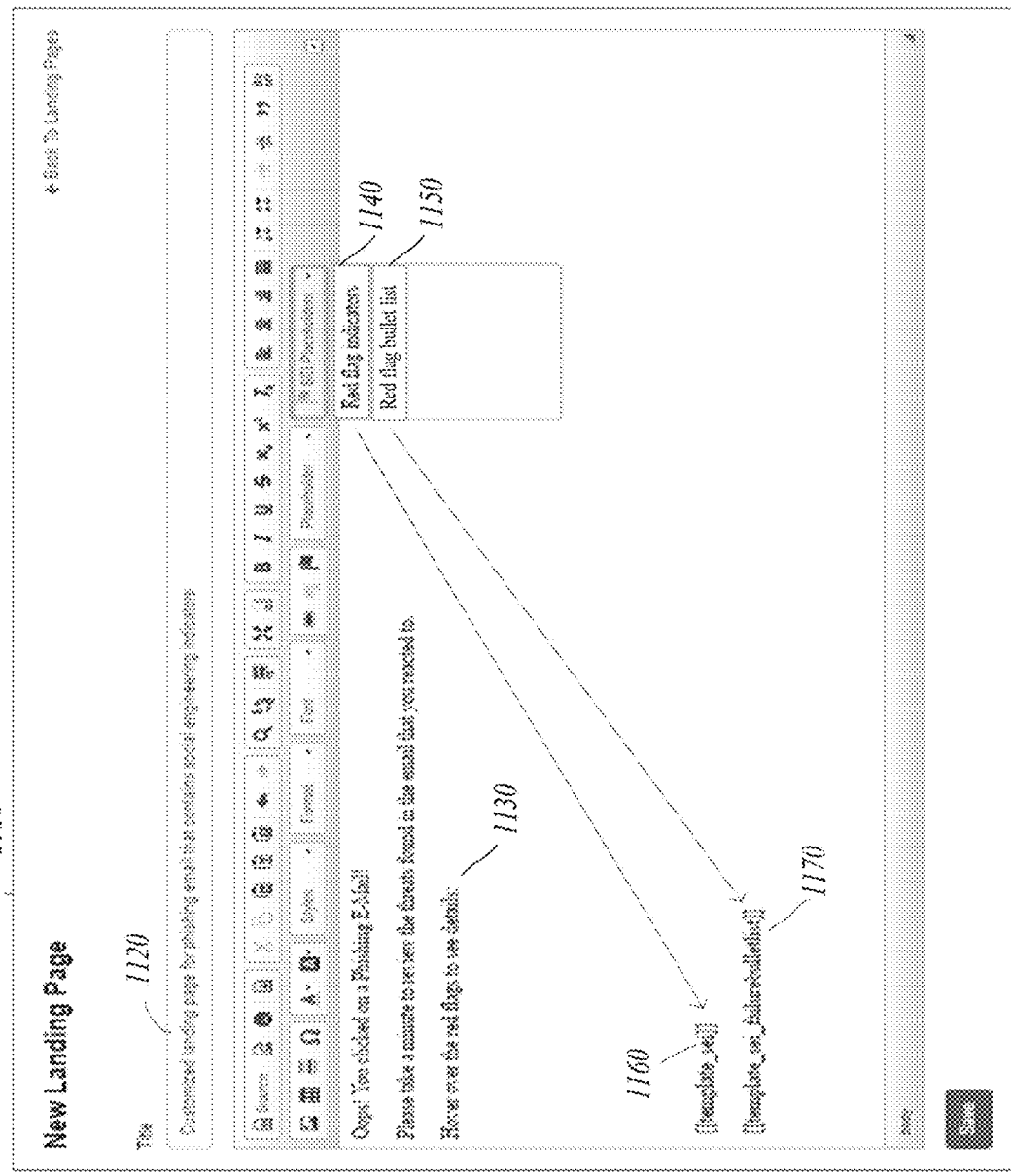
FIG. 11 depicts an example of creating a landing page traversed to responsive to an interaction with the simulated phishing email by a user of an email account of the one or more email accounts receiving the simulated phishing email.

FIG. 11 shows the editing tool being used to create or edit a landing page 1110 using a source code editor. The system administrator can give the landing page a title 1120 that will allow it to be easily identified in the future. Within the landing page the system administrator enters text that they want the user to see when the user fails a simulated phishing attack 1130. Within the body of the landing page, the system administrator can insert social engineering indicator (SEI) placeholders. For instance, the system administrator can insert red flag indicators 1140, which will show the user a copy of the email template with all the failure indicators highlighted. In an embodiment, the system administrator can insert a red flag bullet list 1150, which will display for the user a list of the failure indicators, such as social engineering based failure indicators, that were included in the mail that they responded to. The template shows the insertion of the red flag indicators in the body of the landing page when they are inserted 1160. Similarly, the template shows the insertion of the red flag bullet list in the body of the landing page when they are inserted 1170.

Figure 12:
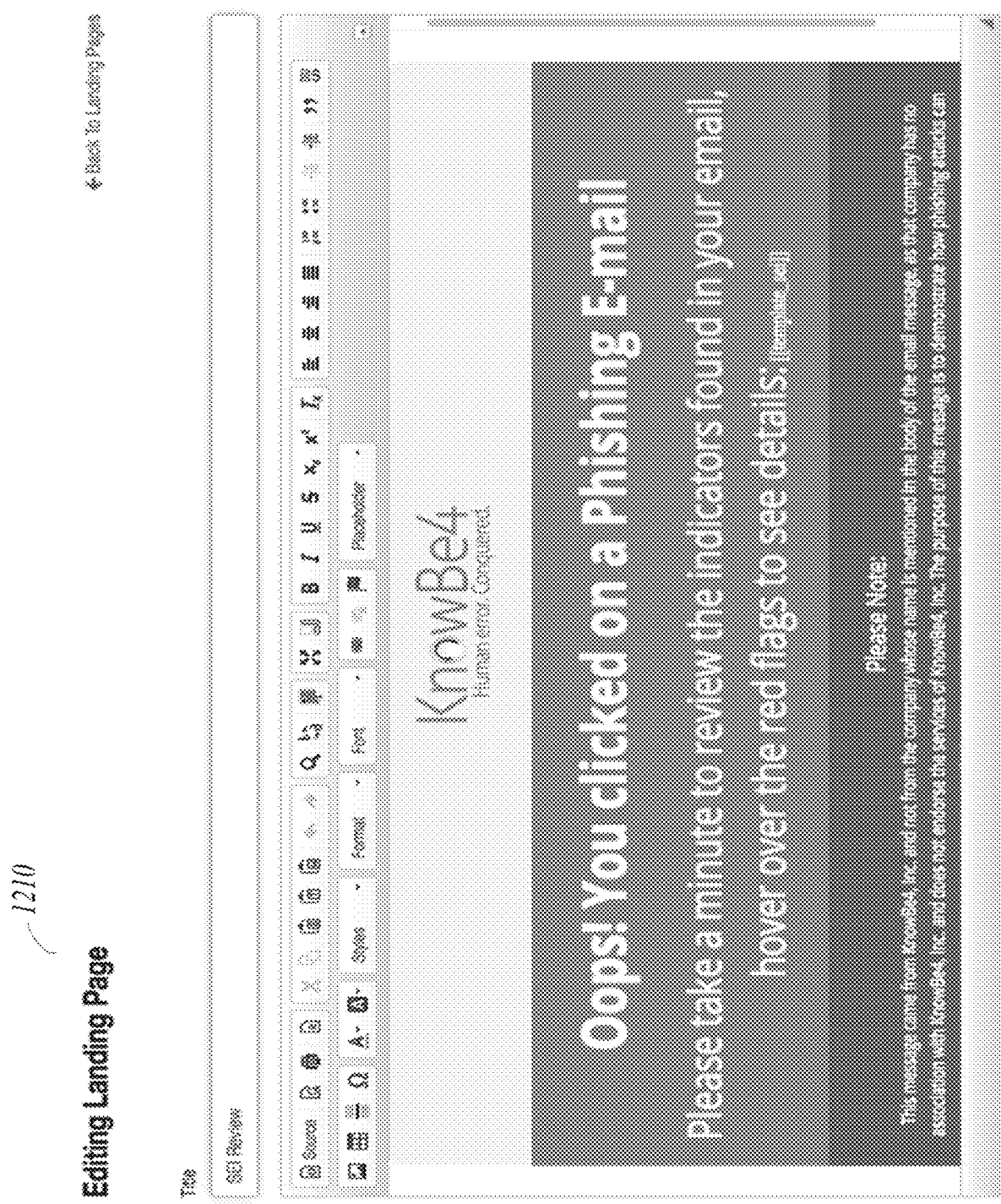
FIG. 12 depicts an example of creating a landing page traversed to responsive to an interaction with the simulated phishing email by a user of an email account of the one or more email accounts receiving the simulated phishing email, using a WYSIWYG editor.

FIG. 12 shows the editing tool being used to create or edit a landing page 1210 using a WYSIWYG editor. As with the source code editor, the system administrator can give the landing page a title that will allow it to be easily identified in the future. Within the landing page the system administrator enters text that they want the user to see when the user fails a simulated phishing attack. Within the body of the landing page, the system administrator can insert social engineering indicator (SEI) placeholders. For instance, the system administrator can insert red flag indicators [[template sei]], which will show the user a copy of the email template with all the failure indicators highlighted.

Figure 13:
FIG. 13 depicts an example of a landing page traversed to responsive to an interaction with the simulated phishing email by a user of an email account of the one or more email accounts receiving the simulated phishing email, showing the failure indicators configured in the email template and showing an example of a description of a failure indicator which is displayed responsive to a user interaction with the failure indicator.

FIG. 13 shows a landing page as the email recipient may see it. In the landing page, the phishing email that the user was sent is shown, however the failure indicators are highlighted in the email. When the user interacts with the failure indicators, the description is shown to the user. In one embodiment, the version of the template that is shown in the landing page is customized to the user's mail client. For example, if the user utilizes Outlook 365, the phishing email showing the failure indicators is formatted to look the same as it would be displayed on Outlook 365, so as to provide the user with a more relevant learning experience.

Figure 14:
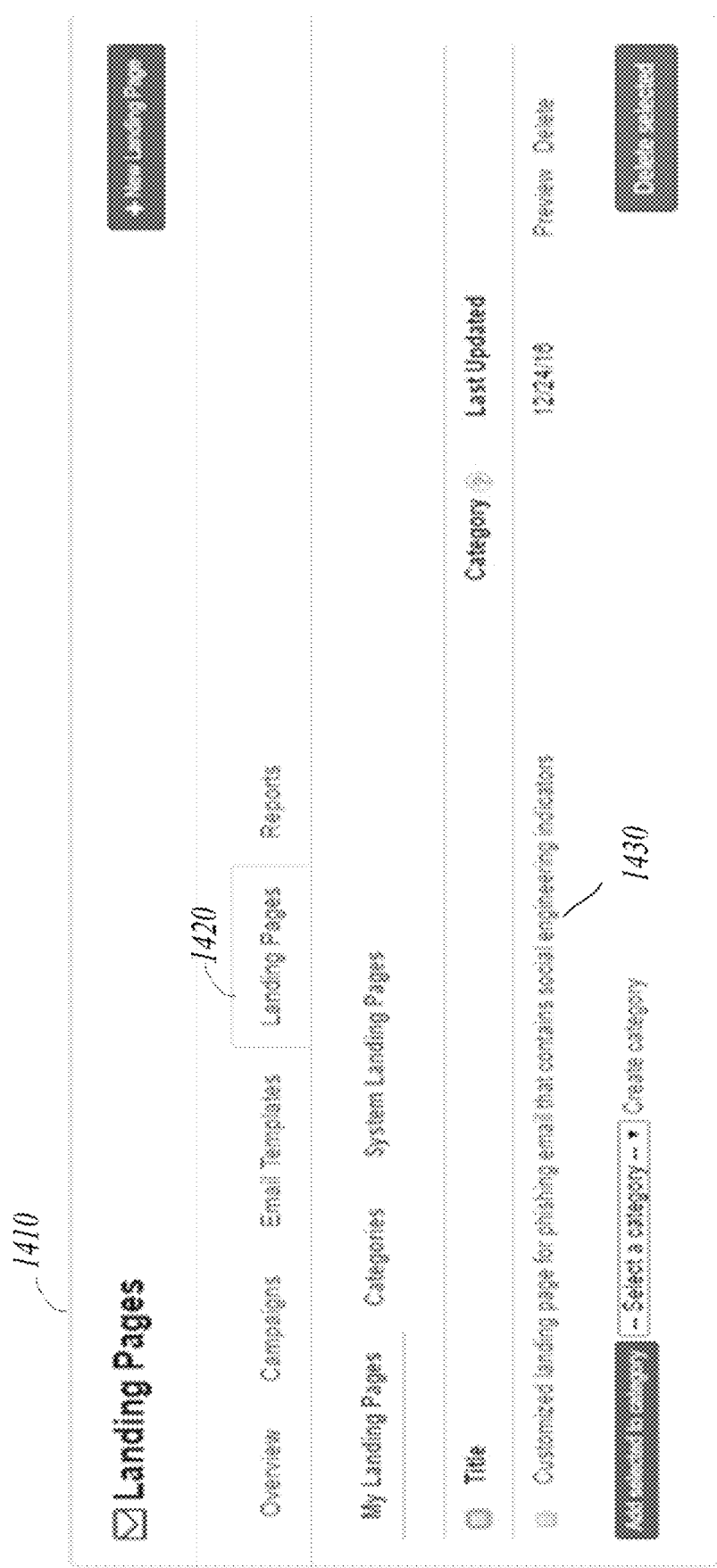
FIG. 14 depicts an example of adding a customized landing page for simulated phishing email that contains failure indicators to a category.

FIG. 14 illustrates associating landing pages with categories. In one embodiment, in the landing page display window 1410, the landing pages tab 1420 can be selected, which will display a list of the landing pages. Once the category is created, landing page templates can be associated with the new category. In one embodiment, all the landing page templates 1430 are shown to the system administrator by selecting the landing pages tab 1420. In an embodiment, the system administrator may select one or more landing pages by checking the box beside the landing page name. The system administrator may select an existing category, or may create a new category. Once the desired category is selected, the system administrator may add the one or more selected landing pages to the category 960.

Figure 15:
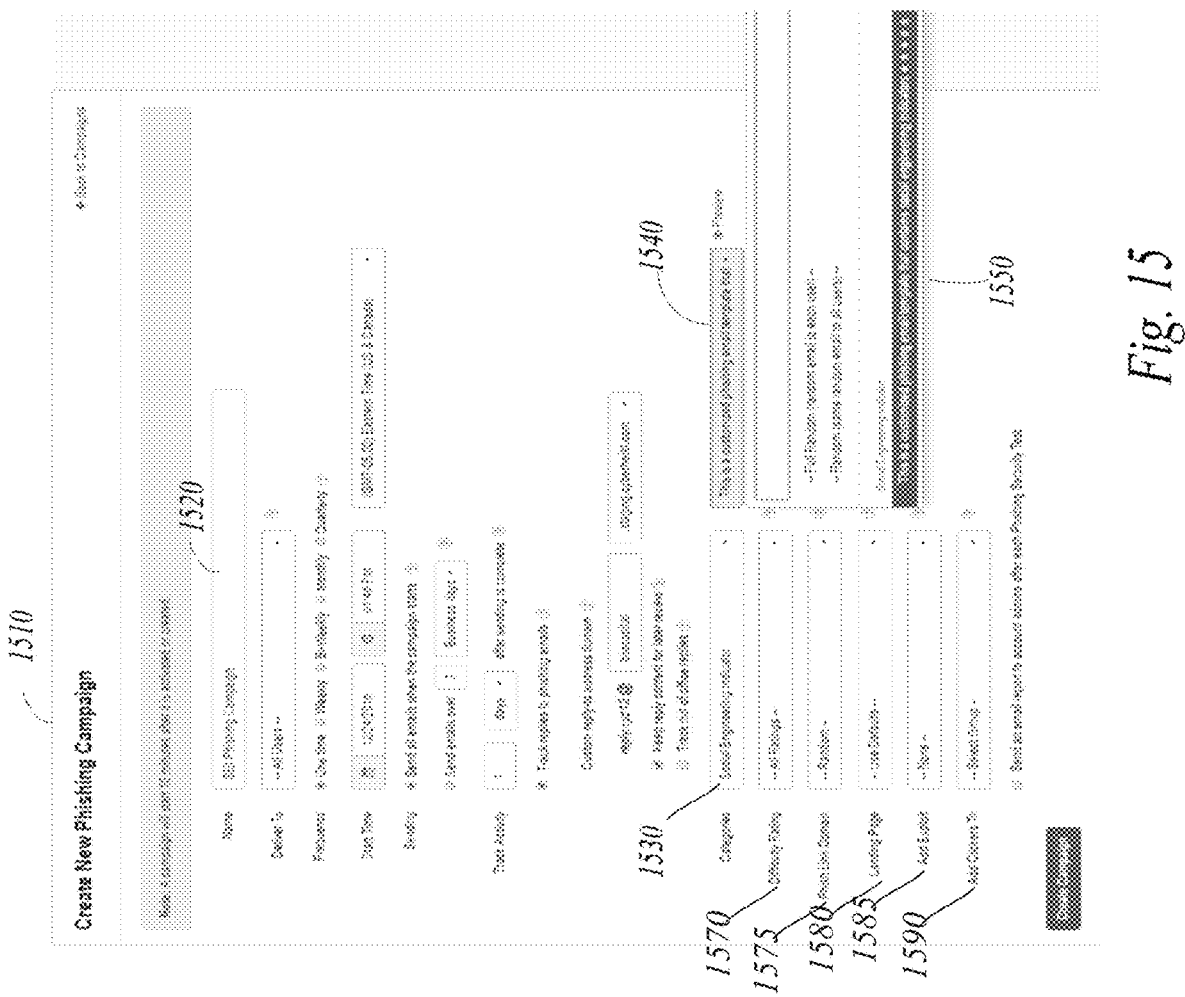
FIG. 15 depicts an example of creating a new phishing campaign, comprising selecting a social engineering indicator category and selecting a customized phishing email template that contains social engineering indicators.

FIG. 15 illustrates a first example screen for creating a new phishing campaign 1510. The system administrator can give the new phishing campaign a name 1520 so that it can be easily identified at a later date. In creating the phishing campaign, the system administrator may choose to create a campaign using social engineering based failure indicators, by selecting the social engineering indicator category 1530. Once the category is selected, the system administrator can select one of the phishing email templates from that category 1550, which is then displayed on the new phishing campaign screen 1540.

The system administrator also can select a difficulty rating 1570 for the new phishing campaign. In some implementations, the difficulty rating can refer to the level of sophistication of the phishing campaign. For example, selecting a higher degree of difficulty may be expected to result in a larger percentage of users interacting with one or more failure indicators included within the phishing campaign, as the failure indicators included in a more difficult phishing campaign may be harder for users to detect. The system administrator also can select a phishing link domain 1575. The domain for the phishing link may be selected to mimic a domain associated with a trusted entity, such as a financial institution, so that a user who is redirected to the selected domain after selecting a link as part of the phishing campaign may believe that he or she has arrived at a website hosted by the trusted entity. The system administrator also can select a landing page 1580 to use for the phishing campaign. In some implementations, multiple landing pages, such as the landing page shown in FIG. 13, can be created and stored, and the system administrator can select one of the stored landing pages to use for the new phishing campaign. The system administrator also can choose to add an exploit 1585 to the new phishing campaign. For example, an exploit may be any type or form of malicious behavior, such as the unauthorized collection of user data, that is triggered as a result of a user interacting with one or more failure indicators in the phishing campaign. An example of configuring one such exploit is described further below in connection with FIG. 18. The system administrator also can elect to add clickers (i.e., users who interact with one or more failure indicators) to a selected group 1590. The group may be formed by adding an indication of each such user to a data structure, so that the group of users who fell victim to the phishing campaign can be quickly and easily identified.

Figure 16:
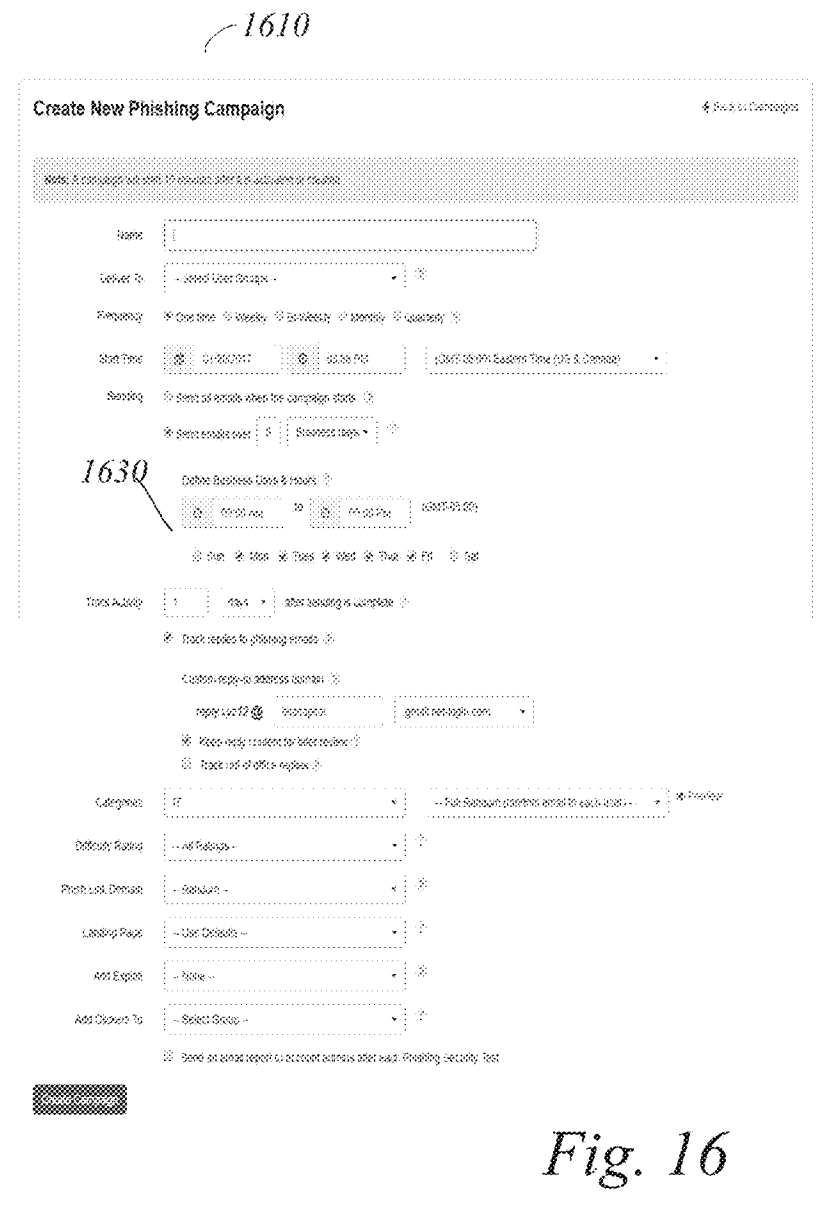

FIG. 16 depicts a second example screen for creating a new phishing campaign 1610, according to an illustrative example. The screen 1610 is similar to the screen 1510 shown in FIG. 15, but differs from the screen 1510 in that the screen 1610 further allows the system administrator to define a set of business days over which the emails of the new phishing campaign should be sent. For example, the system administrator can select a time range representing the normal business hours for the organization conducting the new phishing campaign, as well as the day of the week representing typical business days for the organization. Doing so allows the emails of the phishing campaign to be sent during business hours when most users will be expecting to receive business emails, thereby increasing the effectiveness of the new phishing campaign.

Figure 17:
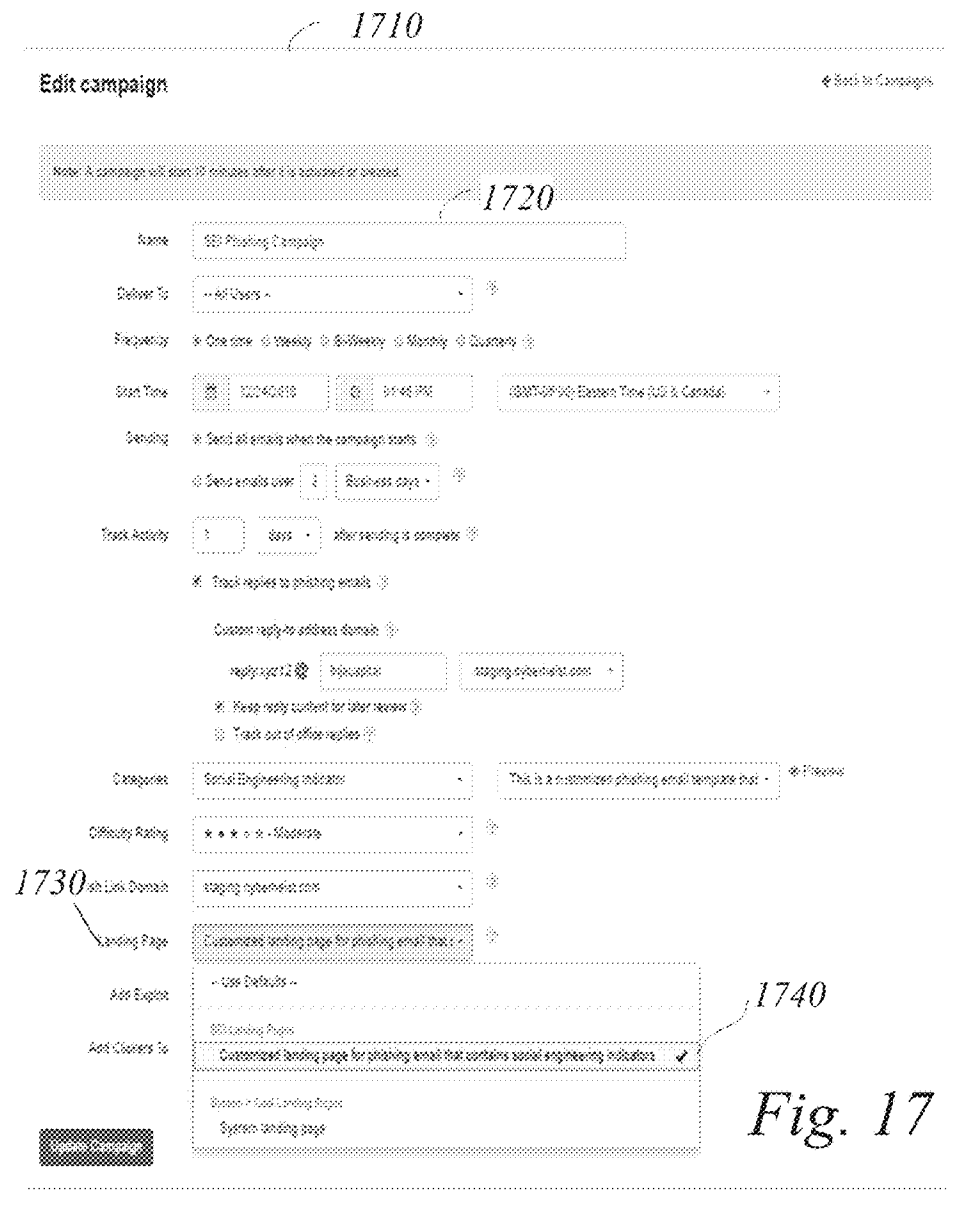

FIG. 17 illustrates a screen for editing a phishing campaign 1610. The system administrator can again give the phishing campaign a new name 1620, such that it can be easily identified at a later date. The campaign editing screen allows the user to select a landing page 1630. The landing page selector shows landing pages in the category that was selected for the campaign, and the template user is able to select the landing page of their choice in this category 1640.

Figure 18:
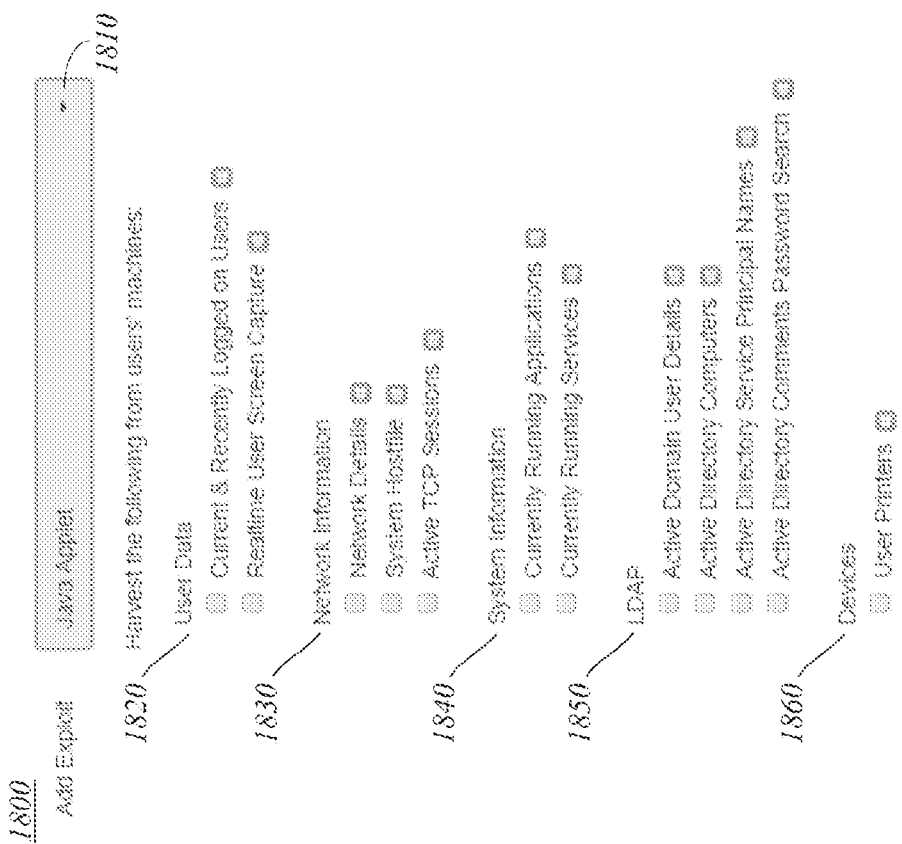
FIG. 18 depicts an example of an interface for selecting an exploit to be included in a phishing campaign, according to an illustrative implementation.

FIG. 18 depicts an example of an interface 1800 for selecting an exploit to be included in a phishing campaign, according to an illustrative implementation. In some implementations, the interface 1800 can be generated based on a selection by a system administrator of an exploit 1585 when creating a new phishing campaign, as shown in FIG. 15. The interface 1800 includes a dropdown menu 1810 including one or more selectable exploit types. In this example, the selected exploit type is a Java applet, however the system administrator may select a different type of exploit in other implementations. In some implementations, the Java applet can be configured to execute on a website such as the landing page that is shown to a user who interacts with one or more failure indicators in an email of the phishing campaign. Thus, the Java applet can surreptitiously collect and store information from users who visit the landing page on which the Java applet executes.

After selecting the type of exploit from the dropdown menu 1810, the system administrator can select various forms of information to harvest from users' machines via the exploit (e.g., the Java applet). The harvested information can include user data 1820, network information 1830, system information 1840, LDAP information 1850, and device information 1860. It should be noted that the selectable options for data to be collected as shown in FIG. 18 are illustrative only. In some implementations, the interface 1800 may include more, fewer, or different types and forms of data that may be selected by the system administrator. For example, the types of data that are displayed in the interface 1800 may depend on the type of exploit selected from the dropdown menu 1810.

To provide more detailed granularity of the type of information that can be harvested by the selected exploit, one or more check boxes can be displayed within each data category as shown in FIG. 18. For example, the system administrator can use the check boxes to configure the exploit to collect a particular form of user data (e.g., current and recently logged on users) but not to collect another form of user data (e.g., realtime user screen capture). Similarly, the system administrator can select the appropriate check boxes to configured the exploit to collect any of network details, a system hostfile, and active TCP sessions within the network information 1830, either or both of currently running applications and currently running services within the system information 1840, any of active domain user details, active directory computers, active directory service principal names, and active directory comments password search within the LDAP information 1850, and user printers within the devices information 1860. The combination of selected data types for the exploit to harvest can differ across various phishing campaigns according to the preferences of the system administrator. In some implementations, the system administrator can use the interface 1800 to select different exploit types and/or different information to be harvested for a user or a subset of users within a single phishing campaign.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape.

The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method comprising:
   receiving, by one or more servers, results from one or more simulated phishing campaigns;
   analyzing, by the one or more servers, the results to determine an effectiveness of one or more failure indicators of the one or more simulated phishing campaigns to cause a higher rate of failure;
   displaying, by the one or more servers, on a graphical user interface the results and the effectiveness of the one or more simulated phishing campaigns, the graphical user interface enabling a user to perform one or more actions on the results;
   using, by the one or more servers, the one or more failure indicators for one or more simulated phishing communications in a new simulated phishing campaign.

2. The method of claim 1, wherein the graphical user interface enables the user to perform the one or more actions of: viewing, saving, sharing or printing the results.

3. The method of claim 1, further comprising analyzing, by the one or more servers, the results to determine which users are a security risk based on having a number of failures above a predetermined threshold.

4. The method of claim 1, further comprising analyzing, by the one or more servers, the results to determine the effectiveness of one or more phishing email templates used by the one or more campaigns in generating user failures.

5. The method of claim 4, further comprising determining, by the one or more servers, one or more common failure types for the one or more phishing email templates.

6. The method of claim 4, further comprising determining, by the one or more servers, which failure indicators of the one or more phishing email templates leads to a higher rate of failure.

7. The method of claim 4, further comprising analyzing, by the one or more servers, the results to determine users who interacted with a failure indicator of the one or more simulated phishing campaigns and types of data that were collected during the simulated phishing campaign.

8. A method comprising:
   receiving, by one or more servers, results from one or more simulated phishing campaigns;
   analyzing, by the one or more servers, the results to determine an effectiveness of a security system by correlating a presence of the security system with a lower than average incidence of failures;
   displaying, by the one or more servers, on a graphical user interface one of the results or the effectiveness of the security system, the graphical user interface enabling a user to perform one or more actions on the results; and
   executing, by the one or more servers based at least on one of the results or the effectiveness of the security system, a subsequent simulated phishing campaign to test a readiness of the security system.

9. The method of claim 8, further comprising tracking, by the one or more servers, the average incidence of failures.

10. The method of claim 8, further comprising analyzing, by the one or more servers, the results to determine which users are a security risk based on having a number of failures above a predetermined threshold.

11. The method of claim 8, wherein the graphical user interface enables the user to perform the one or more actions of: viewing, saving, sharing or printing the results.

12. The method of claim 8, further comprising causing, by the one or more servers, the graphical user interface to show a timeline of overall failure rates.

13. The method of claim 12, further comprising determining whether a security policy that was instituted at a particular time in the timeline was effective in improving security.

14. A system comprising:
    one or more servers, comprising one or more processors, coupled to memory and configured to;
    receive results from one or more simulated phishing campaigns;
    analyze the results to determine an effectiveness of a security system or the one or more simulated phishing campaigns;
    display on a graphical user interface the results and the effectiveness of the security system, the graphical user interface enabling a user to perform one or more actions on the results; and
    executing, by the one or more servers based at least on one of the results or the effectiveness of the security system, a subsequent simulated phishing campaign to test a readiness of the security system or users to handle phishing attacks.

15. The system of claim 14, wherein the one or more servers are further configured to analyze the results to determine which users are a security risk based on having a number of failures above a predetermined threshold.

16. The system of claim 14, wherein the one or more servers are further configured to analyze the results to determine the effectiveness of one or more phishing email templates used by the one or more campaigns in generating user failures.

17. The system of claim 14, wherein the one or more servers are further configured to analyze the results to determine the effectiveness of the security system by correlating a presence of the security system with a lower than average incidence of failures.

18. The system of claim 14, wherein the one or more servers are further configured to cause the graphical user interface to show a timeline of overall failure rates.

19. The system of claim 18, wherein the one or more servers are further configured to determine whether a security policy that was instituted at a particular time in the timeline was effective in improving security.

20. The system of claim 14, wherein the graphical user interface enables the user to perform the one or more actions of: viewing, saving, sharing or printing the results.

* * * * *